(12) United States Patent
Mendler

(10) Patent No.: US 12,044,247 B2
(45) Date of Patent: Jul. 23, 2024

(54) HYBRID ELECTRIC TURBOCHARGER

(71) Applicant: Edward Charles Mendler, Mill Valley, CA (US)

(72) Inventor: Edward Charles Mendler, Mill Valley, CA (US)

(*) Notice: Subject to any disclaimer, the term of this patent is extended or adjusted under 35 U.S.C. 154(b) by 0 days.

(21) Appl. No.: 17/300,925

(22) PCT Filed: Jul. 21, 2020

(86) PCT No.: PCT/US2020/000026
§ 371 (c)(1),
(2) Date: Dec. 16, 2021

(87) PCT Pub. No.: WO2021/015814
PCT Pub. Date: Jan. 28, 2021

(65) Prior Publication Data
US 2024/0125330 A1    Apr. 18, 2024

Related U.S. Application Data

(60) Provisional application No. 62/995,438, filed on Jan. 27, 2020, provisional application No. 62/995,066, filed on Jan. 10, 2020, provisional application No. 62/974,234, filed on Nov. 20, 2019, provisional application No. 62/922,091, filed on Jul. 23, 2019.

(51) Int. Cl.
*F04D 27/02* (2006.01)
*F02B 37/10* (2006.01)
*F02B 37/22* (2006.01)
*F02B 39/10* (2006.01)
(Continued)

(52) U.S. Cl.
CPC .............. *F04D 27/02* (2013.01); *F02B 37/10* (2013.01); *F02B 37/225* (2013.01); *F02B 39/10* (2013.01); *F04D 17/10* (2013.01); *F04D 29/464* (2013.01)

(58) Field of Classification Search
CPC ...... F04D 17/10; F04D 27/02; F04D 27/0253; F04D 29/464; F02B 37/22; F02B 37/225
See application file for complete search history.

(56) References Cited

U.S. PATENT DOCUMENTS 2,083,447 A    6/1937 Hoffmann
2,656,096 A   10/1953 Schwarz
(Continued)

*Primary Examiner* — David E Sosnowski
*Assistant Examiner* — Jackson N Gillenwaters

(57) ABSTRACT

According to the present invention, the impeller inlet of a turbocharger compressor receives intake air from an inner channel and an outer channel. The outer channel is pressurized with an electrically powered secondary compressor. The pressurized air in the outer channel flows into the impeller near the outer wall of the impeller inlet. The pressurized air next to the outer wall of the impeller inlet prevents backflow of air out of the impeller and thereby prevents surge and enables the compressor to produce high boost pressures under small mass flow settings. Only a portion of the intake air is pressurized with the electrically powered secondary compressor, and the boost pressure of the electrical compressor is only a fraction of the turbocharger compressor's overall pressure ratio. Consequently, only a small amount of electrical power is required to drive the secondary compressor, thereby enabling conventional 12 volt batteries to be used to power the electrical compressor for almost all automotive applications.

17 Claims, 19 Drawing Sheets

(51) Int. Cl.
*F04D 17/10* (2006.01)
*F04D 29/46* (2006.01)

(56) References Cited

U.S. PATENT DOCUMENTS

| | | |
|---|---|---|
| 6,079,211 A * | 6/2000 | Woollenweber ........ F02B 37/22 |
| | | 60/602 |
| 6,722,129 B2 * | 4/2004 | Criddle ................ F01M 13/022 |
| | | 123/562 |
| 6,813,887 B2 | 11/2004 | Sumser |
| 7,575,411 B2 | 8/2009 | Wood |
| 7,721,542 B2 | 5/2010 | Chen |
| 8,137,057 B2 | 3/2012 | Wood |
| 9,243,550 B2 | 1/2016 | Miazgowicz |
| 9,719,518 B2 | 8/2017 | Mohtar |
| 9,777,737 B2 | 10/2017 | Houst |
| 9,822,698 B2 | 11/2017 | Montar |
| 9,845,723 B2 | 12/2017 | Mohtar |
| 9,850,913 B2 | 12/2017 | An |
| 10,107,296 B2 | 10/2018 | Sun |
| 10,227,917 B2 | 3/2019 | Mohtar |
| 10,570,905 B2 | 2/2020 | Mohtar |
| 10,578,124 B2 | 3/2020 | Zeng |
| 10,584,719 B2 | 3/2020 | Zeng |
| 10,590,836 B2 | 3/2020 | McConville |
| 2006/0096287 A1 | 5/2006 | Sumser |
| 2006/0207253 A1 | 9/2006 | Sumser |
| 2006/0218921 A1 | 10/2006 | Sumser |
| 2007/0125082 A1 | 6/2007 | Surser |
| 2007/0266705 A1 | 11/2007 | Wood |
| 2011/0011084 A1 | 1/2011 | Yanagida |
| 2015/0063989 A1 | 3/2015 | Wang |
| 2016/0123333 A1 | 5/2016 | Mohtar |
| 2016/0131145 A1 | 5/2016 | Mohtar |
| 2016/0265424 A1 | 9/2016 | Tingaud |
| 2017/0298953 A1 * | 10/2017 | Lombard .............. F04D 27/002 |
| 2019/0048876 A1 | 2/2019 | Mohtar |
| 2019/0078586 A1 | 3/2019 | Zeng |
| 2019/0178151 A1 | 6/2019 | Smith |
| 2019/0195122 A1 | 6/2019 | Taylor |
| 2019/0264603 A1 | 8/2019 | Hiller |
| 2020/0116077 A1 | 4/2020 | Weiss |

\* cited by examiner

HYBRID ELECTRIC TURBOCHARGER

This application relates to Provisional Application Nos. 62/922,091 having a filing date of Jul. 23, 2019, Provisional Application No. 62/974,234 having a filing date of Nov. 20, 2019, Provisional Application No. 62/995,066 having a filing date of Jan. 10, 2020 and Provisional Application No. 62/995,438 having a filing date of Jan. 27, 2020.

BACKGROUND OF THE INVENTION

A problem with prior art turbochargers is their inability to provide high boost pressure ratios for all engine speeds. FIG. 1 shows a turbocharger compressor efficiency map for a prior art turbocharger. Boost pressure ratio is shown on the vertical axis, and air mass flow through the compressor is shown on the horizontal axis. Pressure ratio is equal to the compressor outlet pressure divided by the compressor inlet pressure. Pressure ratio is calculated using absolute pressure values. The range of operation for the compressor is bound by the surge line 2 on the left side of the map, and the near-choked low-efficiency line 4 on the right side of the map, both lines being dashed. To the left of the surge line 2 flow through the compressor begins to stall leading to sever flow oscillation and surge. At the near-choked line 4 air flow into the compressor approaches Mach 1, a limitation to air inlet flow speed. Efficiency contour lines 6 and compressor rotational speed or RPM lines 8 are also shown.

For an internal combustion engine to have an approximately constant torque value at all engine speeds, the boost pressure also needs to be approximately constant at all engine speeds. If this criteria is met, the air mass flow into the engine is generally proportional to engine speed.

For example, with reference to FIG. 1, if we have an internal combustion engine operating at 6000 RPM and requiring an air flow of 60 pounds per minute at a pressure ratio of 2.5 as shown at point 10, the same engine operating at 1000 RPM will require an air flow of 10 pounds per minute at a pressure ratio of 2.5 as shown at point 12 if the torque values for the engine are to be approximately the same at 1000 RPM and 6000 RPM. The turbocharger compressor illustrated in FIG. 1 cannot deliver the required boost pressure at 1000 PM because the flow condition is to the left of the surge line 2. The boost pressure achievable without crossing the surge line is much smaller and shown at point 14. The achievable torque at the low engine speed is much smaller due to the smaller pressure ratio. Loss of torque at low engine speeds is a significant problem with prior art turbochargers.

Point 12 is referred to generally as a small mass flow setting or small flow setting for the compressor, and point 10 is referred to generally as a large mass flow setting or large flow setting for the compressor.

In addition to poor performance, the low boost pressure can lead to increased diesel emissions. Diesel particulate emissions is a significant problem when combustion takes place without sufficient air.

To increase boost pressure at point 12 a smaller turbocharger could be used with the surge line scaled to the left for a smaller mass flow, but then maximum power is also reduced.

The surge line can be extended somewhat to the left without reducing turbocharger size using ported shroud technology. A prior art ported shroud turbocharger 16 is illustrated in FIG. 2. The compressor map of FIG. 1 is for a ported shroud compressor, and the ported shroud benefit is marked by extended range arrow 18. With the ported shroud turbocharger a small amount of partially compressed air 20 is bled off from the shroud 22 and recycled back into the intake air flow stream 24. Bleeding of a small amount of air inhibits surge and moves the surge line modestly to the left. Ported shroud technology is beneficial, but the ability to move the surge line to the left is limited. Furthermore, bleeding off partially compressed air lowers the compressor efficiency. With loss of efficiency, more power is required from the turbine to drive the compressor. FIG. 2 also shows a dual scroll turbine 26 for driving the compressor impeller 28 through driveshaft 30. The dual scroll turbine 26 is a beneficial technology for increasing turbine power at low engine speeds, and providing more power to drive the ported shroud compressor. The net benefit of these technologies is helpful but not substantial enough for attaining reasonable torque values at all engine speeds.

Pre-swirling the intake air also provides some efficiency benefit but fails to substantially extend the surge line to the left. Examples of pre-swirling designs are shown by Richards U.S. Pat. No. 10,451,087 FIG. 7; Sumser U.S. Pat. No. 6,813,887 FIG. 4 and Miazgowicz U.S. Pat. No. 9,243,550 FIGS. 4 and 6. These designs are characterized as having rotating flow of largely uniform pressure entering the impeller.

Surge is the condition where flow around the outer wall of the impeller inlet backflows uncontrollably upstream. Another approach for inhibiting surge is shown by Mohtar Pub. No. US2019/0048876 FIG. 2A where adjustable blades block the outer portion of the impeller inlet to prevent backflow near the outer wall. A problem with this approach is poor compressor efficiency.

Looking at other boosting options, roots blower and Lysholm supercharging provides a more consistent pressure ratio at all engine speeds. Engine efficiency is compromised, however, because the exhaust energy is no longer utilized for driving the compressor. Roots blower and Lysholm superchargers are also not always able to attain high enough pressure ratios.

VW and more recently Volvo Cars have combined turbocharging and supercharging, where a supercharger is used to attain high boost pressure ratios at low engine speeds, and a turbocharger is used to attain high boost pressure ratios at high engine speeds. The Volvo XC90 T6 2.0 L Turbo/Super-4 sport utility vehicle has included turbo plus supercharging since 2016. The Volkswagen 1.4 L TwinCharger engine was sold in 2009 and 2010. Cost and complexity are problems with this approach. Additionally, during small mass flow conditions the supercharger is employed, and the exhaust energy is not utilized for driving the compressor. Therefore, engine efficiency is not optimum under boosted small mass flow conditions.

The Bendix PBS system provides another approach for increasing torque at low engine speeds, but only for a matter of seconds. With the Bendix system, boost pressure air is drawn from the air brakes of the vehicle. The Bendix PBS system is described in the Bendix News Release titled "Bendix Energy Management System Improves Fuel Savings, Vehicle Performance" Mar. 24, 2010.

Electrically driven compressors have been developed by leading turbocharger manufacturers such as Borg Warner and Garrett Motion and are publicized on their web sites. The Audi SQ7 sport utility vehicle includes an electrically driven compressor. Electric compressors can spool up quickly and provide high boost pressures at low engine speeds. The power required to drive a compressor, however, is significant. For example, it takes almost 90 horsepower to drive the compressor illustrated in FIG. 1 at its 60 lb/min 2.5 pressure ratio setting at point 10. Because an electric motor of that size is commercially impractical, the electrically driven turbocharger is combined with a conventional turbocharger. A small electrically driven compressor is used to attain high boost pressure ratios at low engine speeds, and a conventional turbocharger is used to attain high boost pressure ratios at high engine speeds. Because the electrically driven turbocharger is only used for small mass flow conditions, the size of its motor can be smaller. But the power required to drive the electric compressor is still significant even when it is used only at lower engine speeds. For example, it takes about 15 horsepower (11 kW) to drive the compressor illustrated in FIG. 1 at its 10 lb/min 2.5 pressure ratio setting at point 12. The Audi electric compressor includes a 48 Volt 7 kW motor, and has less power than needed to obtain the 2.5 pressure ratio. While still not having enough power, a costly high voltage system is used because 12 volt batteries are only able to support electric motors up to about 2.5 kW.

Ongoing commercial development efforts indicate the need for a turbocharger that can provide high boost pressure ratios at all engine speeds. The cost of technologies that have been brought to market and those still under development indicates significant commercial value for a low cost solution. Therefore, objectives of the present invention include:

Attaining high boost pressure ratios at all engine speeds
Capable of being powered with 12 volt automotive batteries
Low total system cost
High compressor efficiency at all engine speeds.

SUMMARY OF THE INVENTION

According to the present invention, the impeller inlet of a turbocharger compressor receives intake air from an inner channel and an outer channel. The outer channel is pressurized with an electrically powered secondary compressor. The pressurized air in the outer channel flows into the impeller near the outer wall of the impeller inlet. The pressurized air next to the outer wall of the impeller inlet prevents backflow of air out of the impeller and thereby prevents surge and enables the compressor to produce high boost pressures under small mass flow settings.

Only a portion of the intake air is pressurized with the electrically powered secondary compressor, and the boost pressure of the electrical compressor is only a fraction of the turbocharger compressor's overall pressure ratio. Consequently, only a small amount of electrical power is required to drive the secondary compressor, thereby enabling conventional 12 volt batteries to be used to power the electrical compressor for almost all automotive applications.

During small mass flow settings the inner and outer channels are separated by an adjustable partition for maintaining the higher pressure in the outer channel. During large mass flow settings the partition is adjusted to maximize air intake into the impeller, thereby extending the choked flow limit of the compressor and maximizing the small flow to large flow operational range of the compressor.

Compressor efficiency is further improved by pre-swirling the air entering the outer channel with a volute. A flow control slot is located between the volute and the annular portion of the outer channel to regulate flow into the outer channel and provide a uniformly swirling flow of pressurized air all the way around the outlet of the outer channel.

Compressor efficiency is relatively high during the small mass flow setting due to the compressor not being operated under near-stall flow conditions. The improved compressor efficiency is another reason why the electric power demand is small.

During small mass flow settings power for compressing the intake air is provided by both the turbine of the turbocharger and by the electrically powered compressor. The turbine is not disengaged or bypassed during the small mass flow settings so that its shaft power may contribute to compressing the intake air.

In a first embodiment of the present invention, the adjustable partition includes a slidable ring seal, and in another embodiment the adjustable partition includes aperture blades that pivot into position. In both embodiments air pressure from the electrically powered compressor repositions the adjustable partition, eliminating the need and cost of a secondary actuator for controlling the adjustable partition.

The present invention provides a turbocharging system capable of providing high boost pressure ratios at all engine speeds and being powered with conventional 12 volt batteries for almost all automotive applications. The compressor also has a high efficiency because it is no longer being operated under near-stall flow conditions. Most importantly, the turbocharging system of the present invention has a low cost, in contrast to other technologies currently being pursued.

BREW DESCRIPTION OF THE FIGURES

DETAILED DESCRIPTION OF THE PREFERRED EMBODIMENTS

Figure 1:
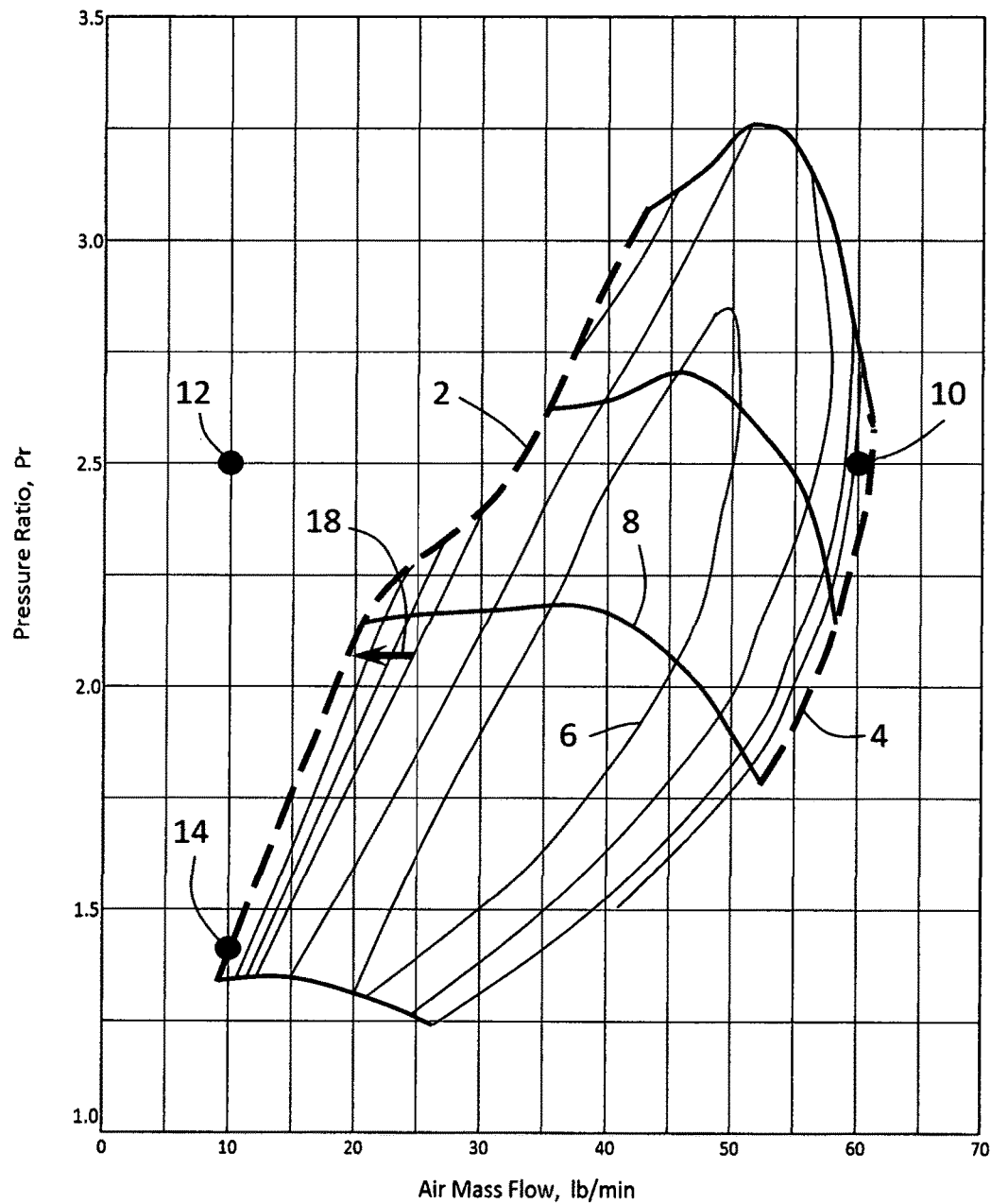
FIG. 1 is intended to illustrate a prior art compressor map.
Figure 2:
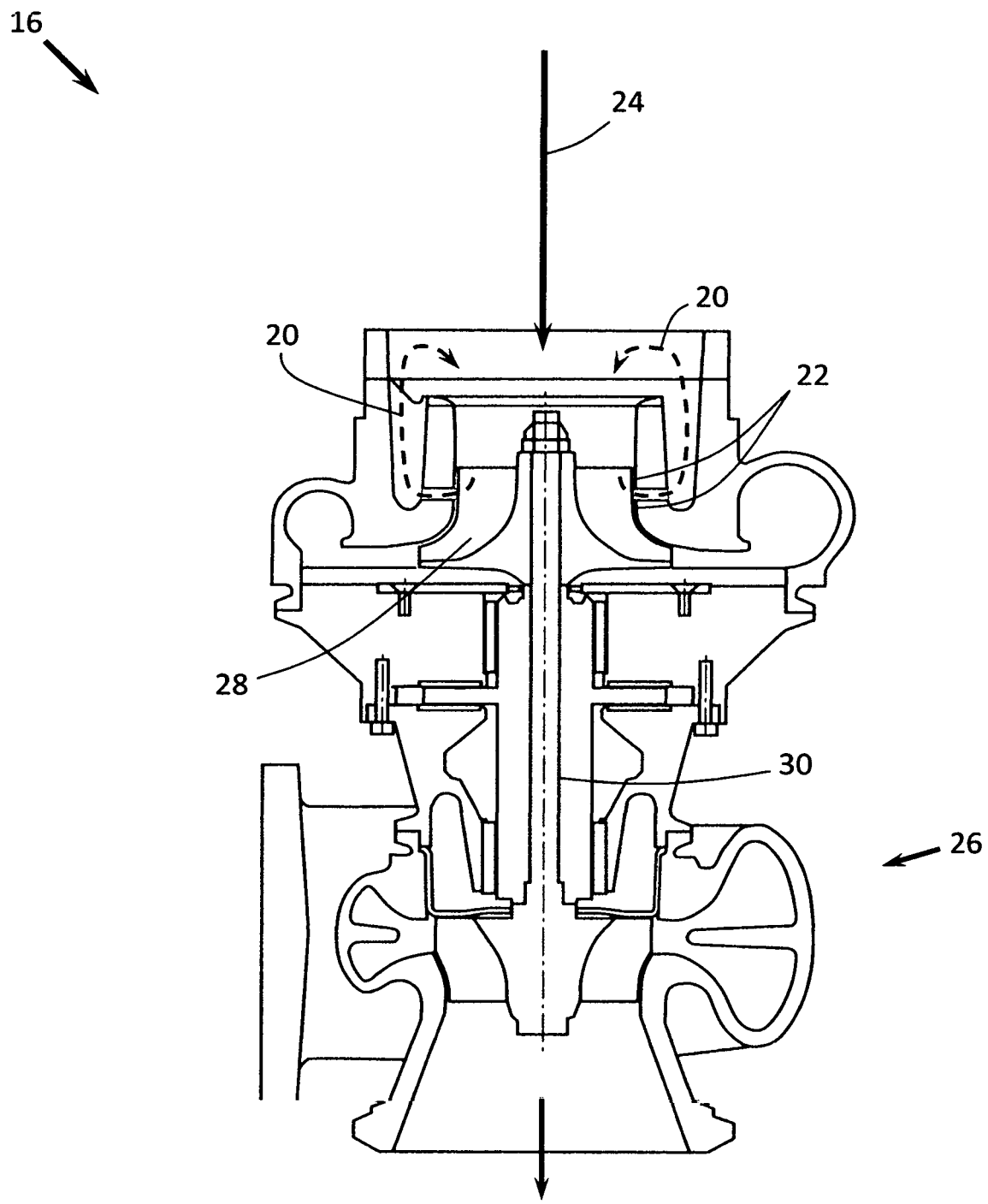
FIG. 2 is intended to illustrate a prior art dual scroll turbocharger having a ported shroud.
Figure 3:
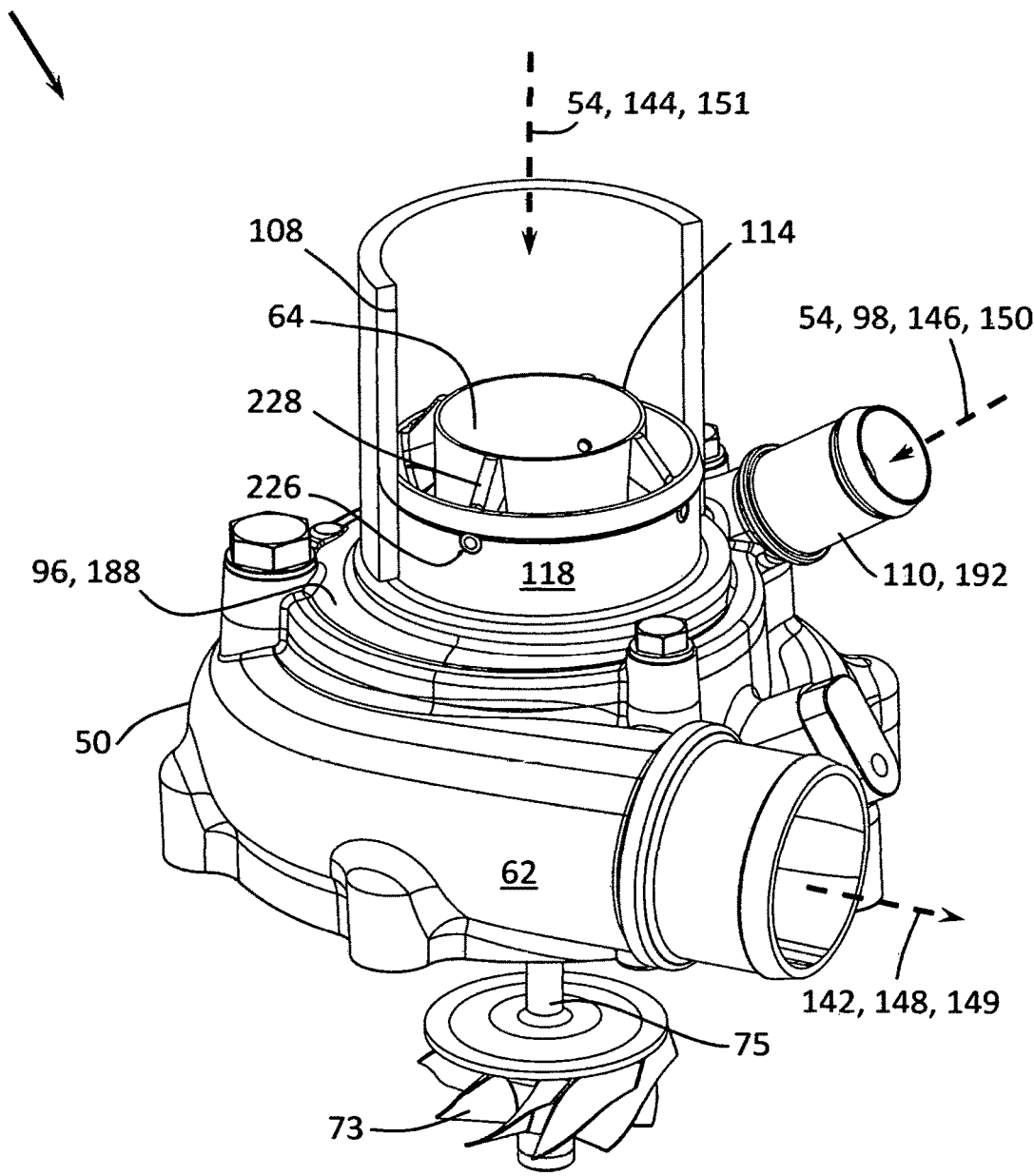
FIG. 3 is intended to illustrate a turbocharger having an extended range compressor according to the present invention, with the exhaust scroll removed to show the turbine.

The following description relates to systems and methods for increasing the operational range of a compressor with an adjustable partition and a secondary electrically powered compressor. The figures are intended to illustrate a number of embodiments of an extended range compressor according to the present invention. FIG. 3 is intended to diagrammatically illustrate a turbocharger having an extended range compressor 42. The exhaust scroll has been removed to show the turbine 73 and driveshaft 75. FIGS. 4 through 7 show the extended range compressor 42 having an adjustable partition 74 having a ring seal 126 that is moved axially, and FIGS. 11 through 14 show an adjustable partition 74 having partition blades 130 that pivot inwardly.

Figure 5:
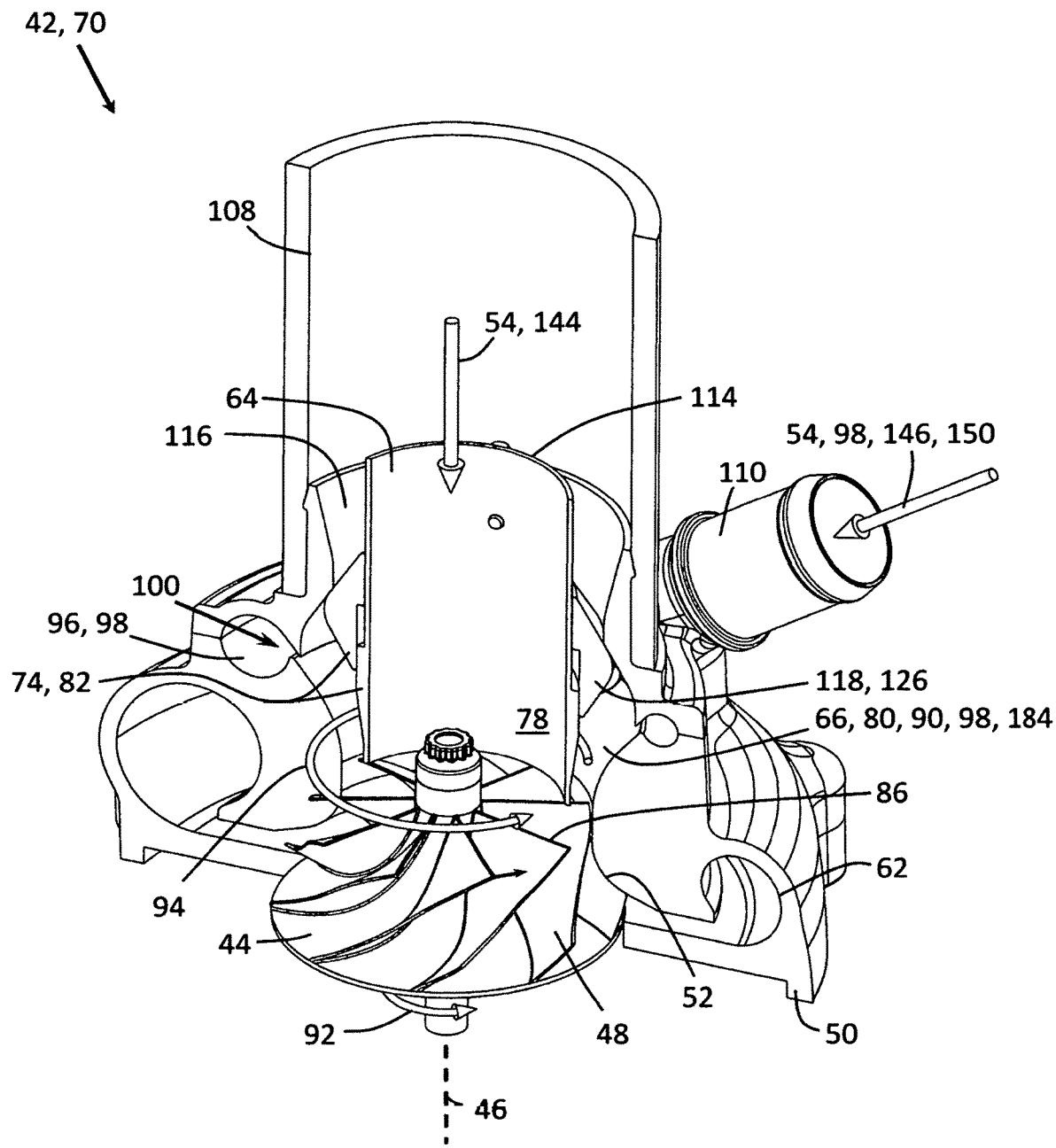
FIG. 5 is similar to FIG. 4 but also shows the adjustable partition in section view.
Figure 6:
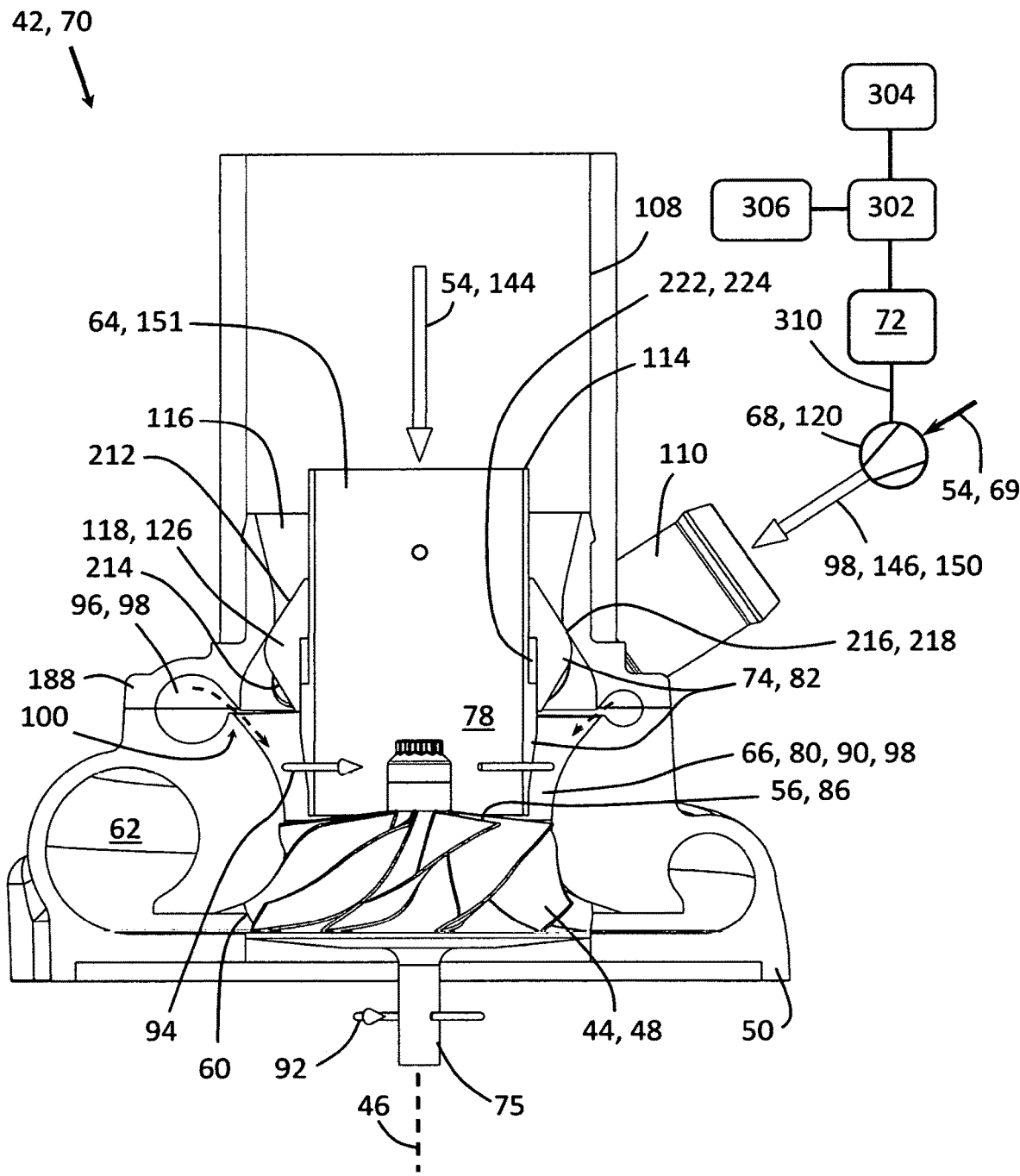
FIG. 6 is a side view of FIG. 5 with the adjustable partition set to the small mass flow setting.

Referring now to FIGS. 5 and 6, extended range compressor 42 has an impeller 44 having an impeller axis of rotation or central axis 46 and a plurality of impeller blades 48. Impeller 44 is rotatably mounted in a casing 50 having a shroud 52 for compression of air or another fluid or combination of fluids 54. Impeller 44 has an impeller inlet 56 and an impeller outlet 60. Air 54 discharged from impeller outlet 60 has an elevated pressure and may be collected in a scroll 62 for delivery to an engine through suitable ducting.

Figure 11:
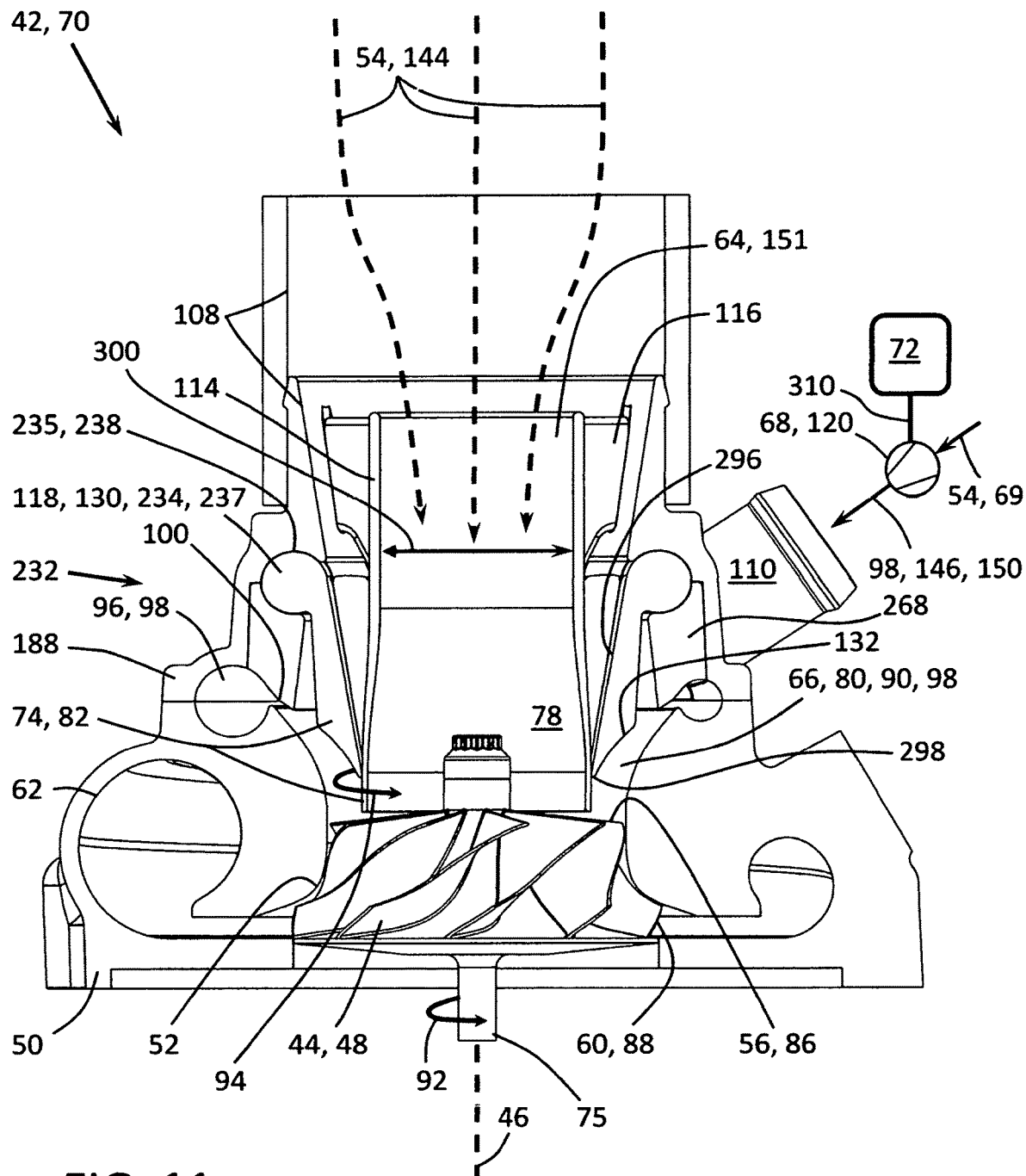
FIG. 11 is intended to diagrammatically illustrate the extended range compressor with partition blades set to the small mass flow setting.
Figure 13:
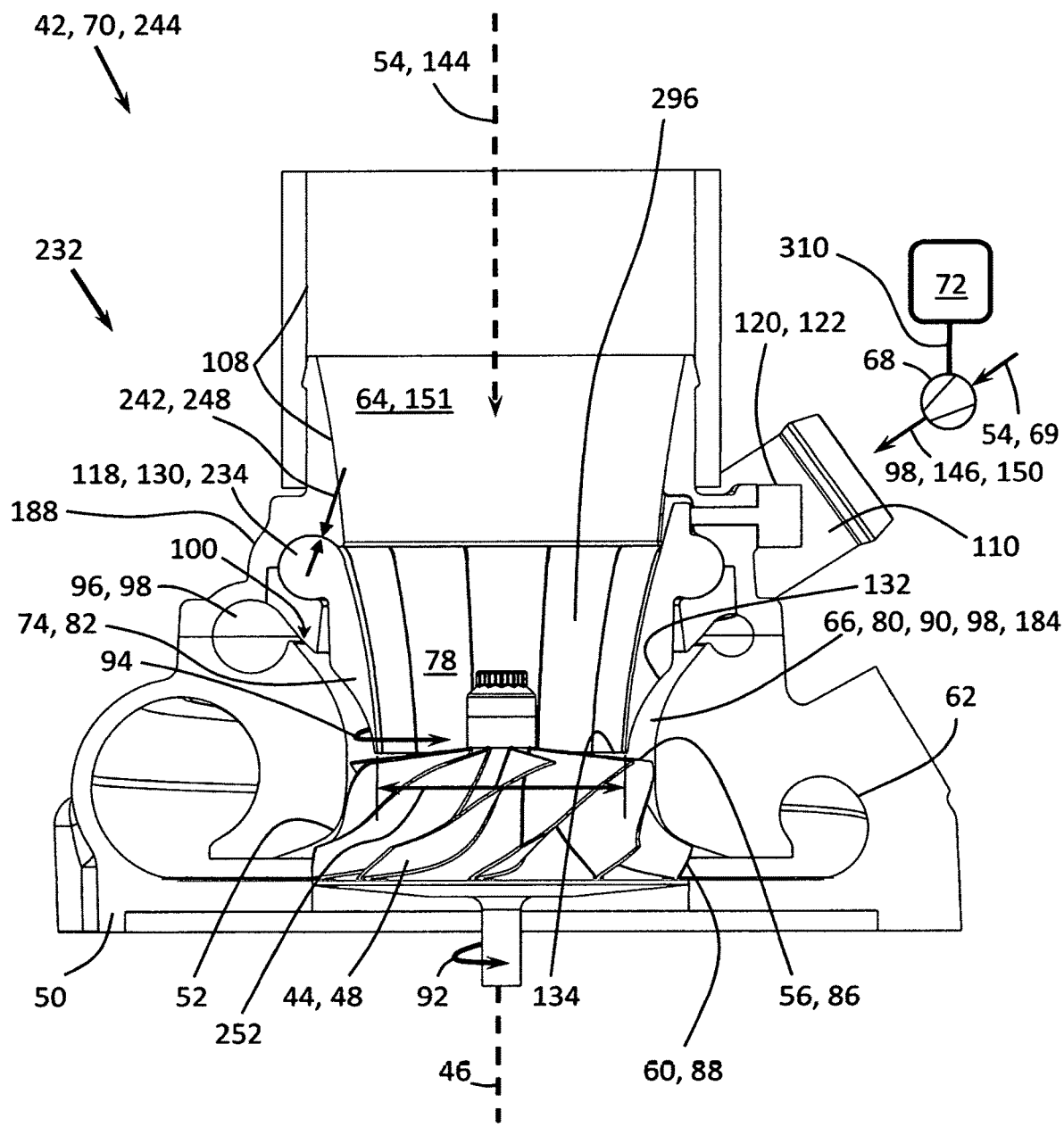
FIG. 13 is similar to FIG. 11 but does not include an inner duct.

Referring now to FIGS. 6, 11 and 13 according to the present invention, the impeller inlet 56 receives air 54 from one or more inner channels 64 and one or more outer channels 66 during a small mass flow setting or more generally a first mass flow setting 70. Air 54 fed into outer channel 66 is pressurized with a secondary compressor 68 during small mass flow settings 70. Secondary compressor 68 is powered by an electric motor 72 in most embodiments of the present invention. The pressurized air 54 is delivered to the outer periphery of the impeller inlet 56 through outer channel 66. The pressurized air 54 around the outer wall of the impeller inlet 56 prevents or inhibits backflow of air 54 out of the impeller 44 and thereby prevents surge and enables the compressor to produce high boost pressures under small mass flow settings.

Figure 7:
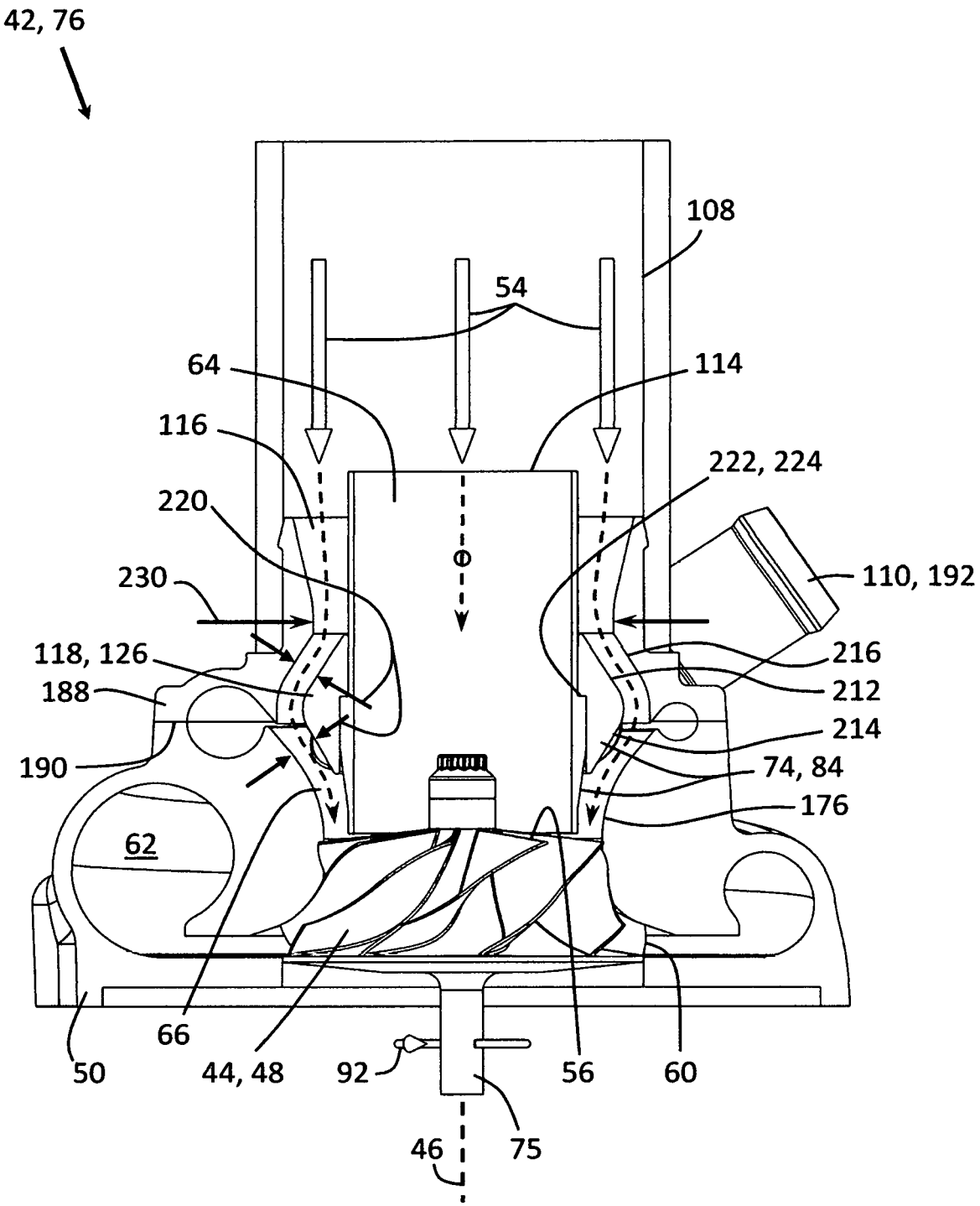
FIG. 7 is similar to FIG. 6 but with the adjustable partition set to the large mass flow setting.
Figure 12:
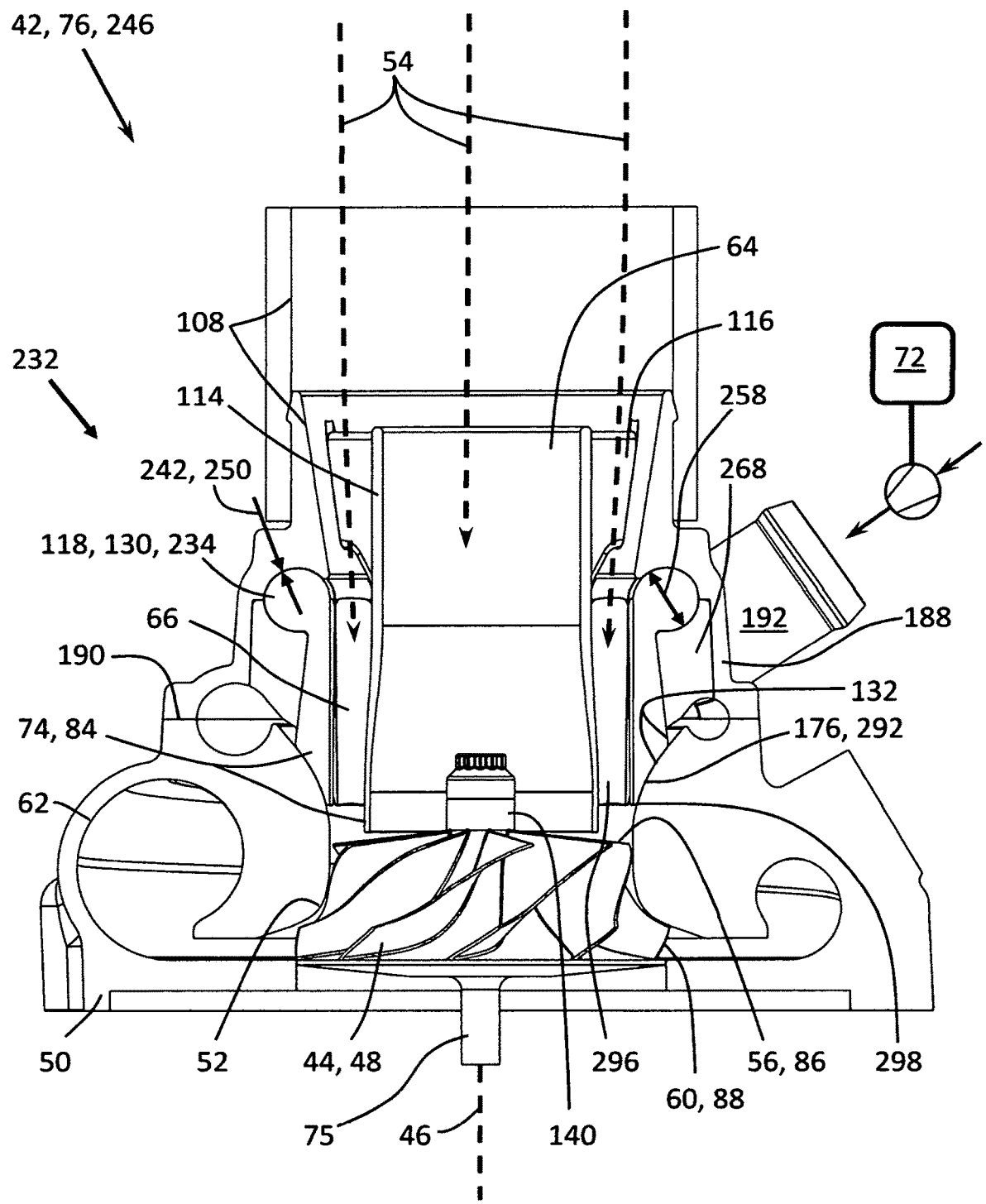
FIG. 12 is similar to FIG. 11 but with the partition blades set to the large mass flow setting.
Figure 14:
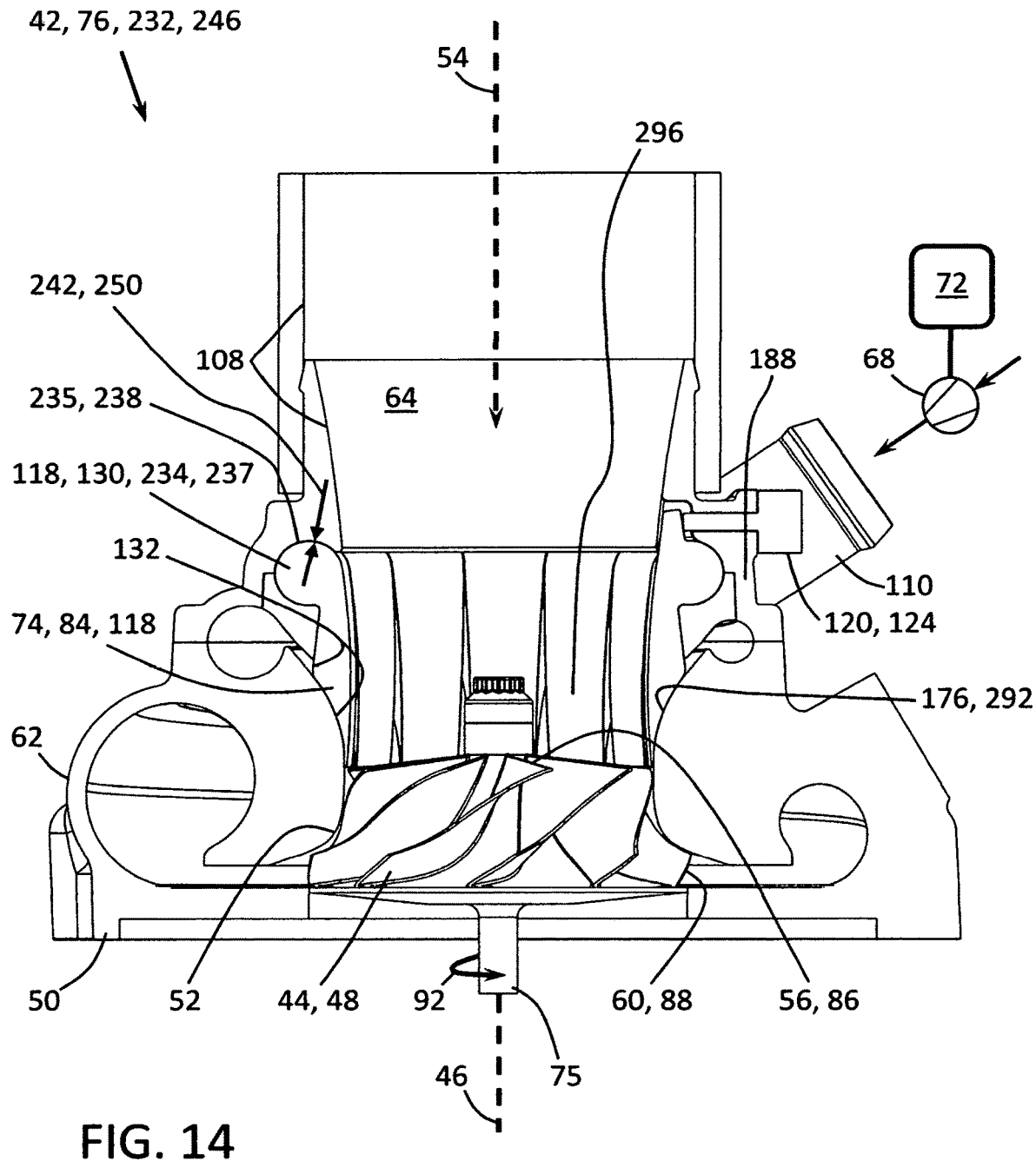
FIG. 14 is similar to FIG. 12 but does not include an inner duct.

During small mass flow settings 70 the inner channel 64 and the outer channels 66 are separated by an adjustable partition 74 for maintaining the higher pressure in the outer channel 66. Referring now to FIGS. 7, 12 and 14 during a large mass flow setting or more generally a second mass flow setting 76, the adjustable partition 74 is adjusted to provide a large and streamlined air intake passageway for maximizing air flow into the impeller inlet 56, thereby extending the choked flow limit of the compressor and maximizing the small flow to large flow operational range of the compressor.

Only a portion of the intake air 54 is pressurized with the electrically powered secondary compressor 68 during small mass flow setting 70, and the boost pressure of the electrical powered secondary compressor is only a fraction of the compressors overall pressure ratio. Consequently, only a small amount of electrical power is required to drive the secondary compressor 68, thereby enabling conventional 12 volt batteries to be used to power the electrically powered secondary compressor 68 for almost all automotive applications of the present invention. During small mass flow settings 70 power for compressing the intake air 54 is provided by both the turbine 73 of the turbocharger 40 and by the electrically powered secondary compressor 68, another reason why only a small amount of electrical power is required to drive the secondary compressor.

The present invention may be employed with 12 volt or higher voltage electric motor drives 72. The present invention enables smaller and lower cost electric motors to be employed, whatever their voltage may be.

Now in greater detail and with reference to FIGS. 3 through 15, extended range compressor 42 has an impeller 44 having an impeller axis of rotation 46 and a plurality of impeller blades 48. Impeller 44 is rotatably mounted in a casing 50 having a shroud 52 for compression of a fluid 54.

Referring now to FIGS. 6, 11 and 13, extended range compressor 42 has a small mass flow setting 70 having an inner channel 64 and an outer channel 66 for flow of fluid 54 into the impeller 44. During the small mass flow setting 70 the inner channel 64 has a first inner channel pressure 78 and the outer channel 66 has a first outer channel pressure 80.

Extended range compressor 42 also has a secondary compressor 68 for increasing the first outer channel pressure 80 relative to the first inner channel pressure 78 during the small mass flow setting 70 for inhibiting backflow of air out of the impeller 44, and thereby enabling the extended range compressor 42 to produce high boost pressures under small mass flow settings 70 without incurring surge.

Extended range compressor 42 also includes an adjustable partition 74 having a first partition position 82 during the small mass flow setting 70. Inner channel 64 and outer channel 66 are separated by the adjustable partition 74 in the first partition position 82 during the small mass flow setting 70 for maintaining the higher pressure in outer channel 66 than in the inner channel 64. First partition position 82 blocks flow from outer channel 66 into inner channel 64 as shown in FIGS. 6, 11 and 13.

Referring now to FIGS. 7, 12 and 14 extended range compressor 42 also has a large mass flow setting 76. Large mass flow setting 76 has a second partition position 84 for providing an increased mass flow of fluid 54 into the impeller 44 during the large mass flow setting 76, thereby providing an extended range compressor 42 able to operate efficiently at both small flow settings and large flow settings.

Figure 8:
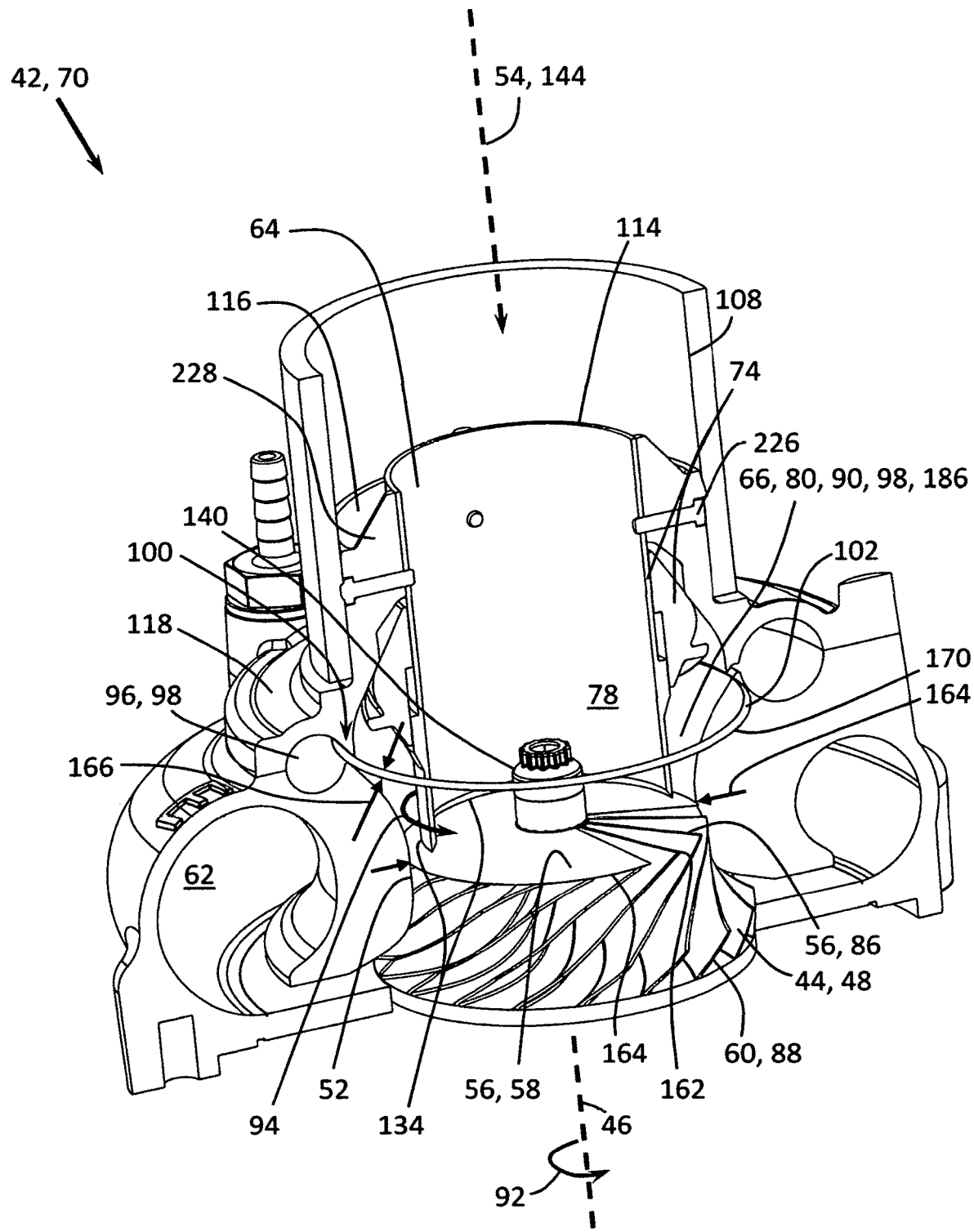
FIG. 8 is intended to diagrammatically illustrate the impeller inlet area and slot curtain area.
Figure 9:
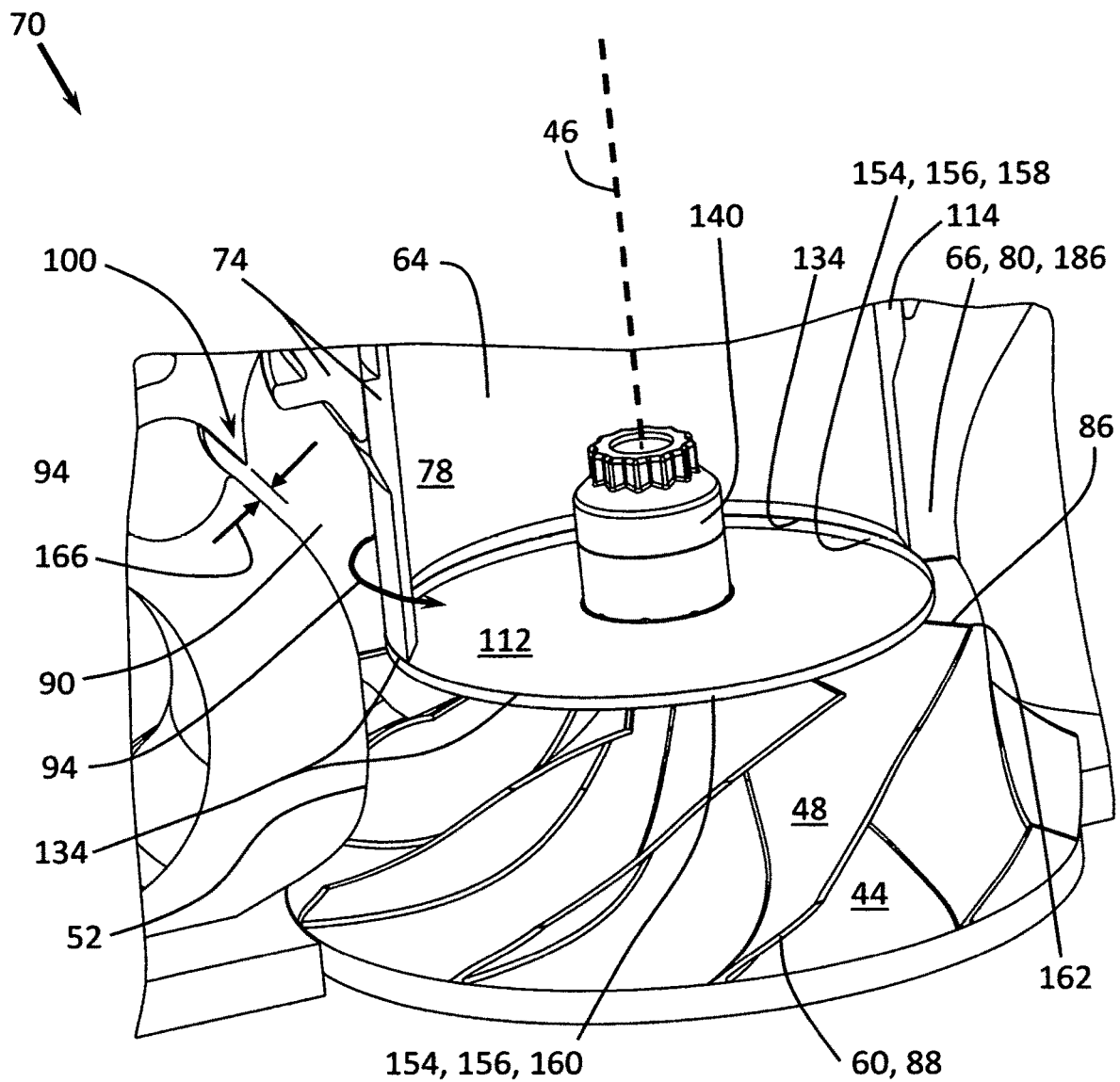
FIG. 9 is intended to diagrammatically illustrate the inner channel outlet area.
Figure 10:
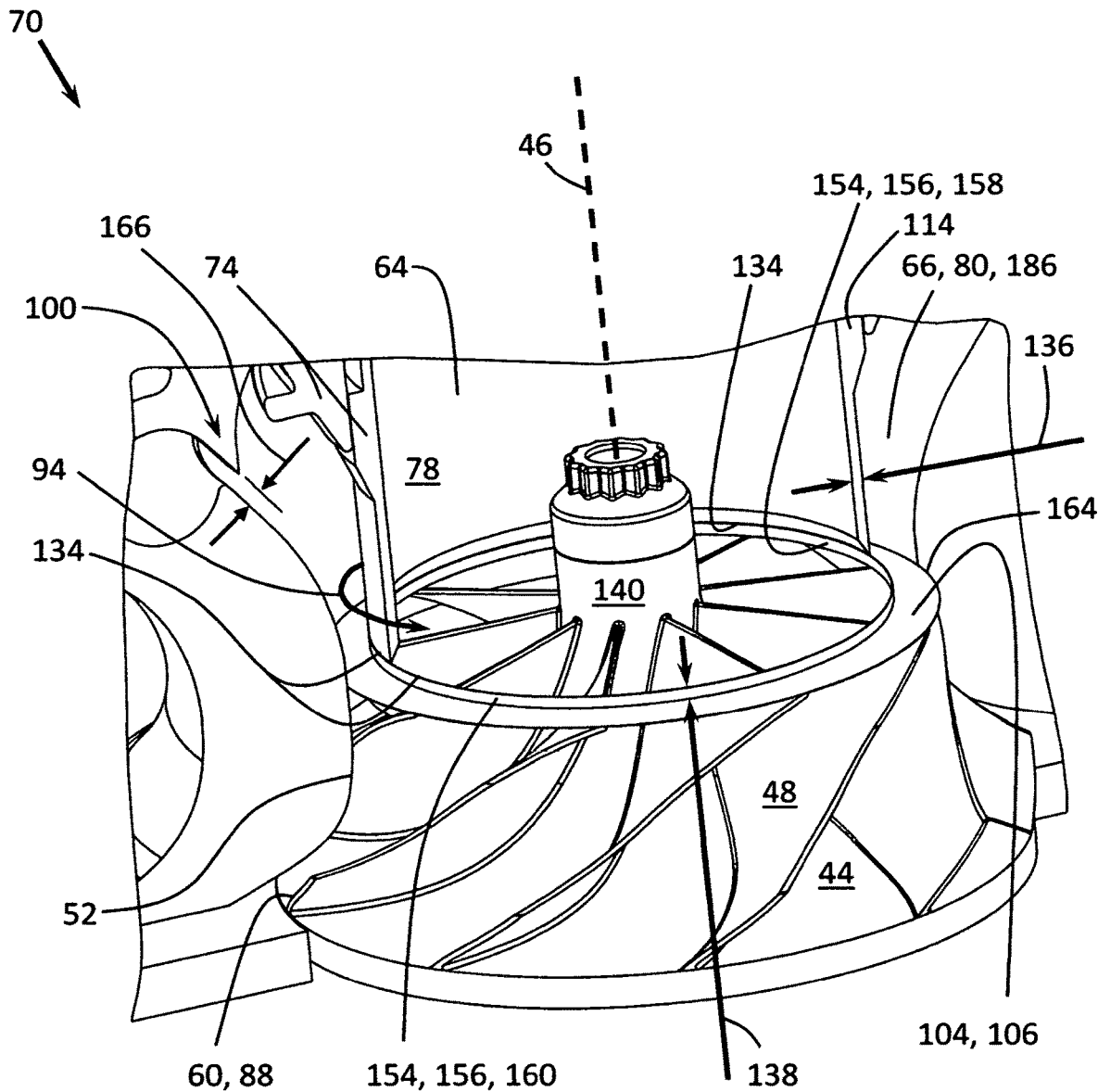
FIG. 10 is intended to diagrammatically illustrate the outer channel outlet area.

Referring now to FIGS. 8, 9 and 10 impeller blades 48 have a leading edge 86 and a trailing edge 88. Rotation about impeller axis of rotation 46 of the leading edge 86 located the farthest upstream and extending into close proximity with the shroud 52 defines the impeller inlet 56 and an imaginary inlet surface area 58.

Similarly, rotation about impeller axis of rotation 46 of the trailing edge 88 located the farthest downstream and extending into close proximity with the shroud 52 defines the impeller outlet 60. Some embodiments of the present invention may have splitter blades that are shorter than impeller blades 48. The shorter splitter blades are not used to define the impeller inlet 56 or the impeller outlet 60 if the splitter blades do not extend to the shroud and as far upstream and downstream respectively relative to the longer impeller blades 48.

In more detail, extended range compressor 42 has a small mass flow setting 70 having an inner channel 64 and an outer channel 66 for flow of fluid 54 into the impeller inlet 56 through imaginary inlet surface area 58. Extended range compressor 42 also has a secondary compressor 68 for increasing the first outer channel pressure 80 relative to the first inner channel pressure 78 during the small mass flow setting 70 for preventing or minimizing backflow of air out of the impeller inlet 56, and thereby enabling the compressor to produce high boost pressures under small mass flow settings without incurring surge.

According to the present invention, the first outer channel pressure 80 is more than twenty percent higher than the first inner channel pressure 78, thereby preventing compressor surge during the small mass flow setting 70. The first inner channel pressure 78 and first outer channel pressure 80 are absolute static pressures.

For example, if the first inner channel pressure 78 is atmospheric, or about 14.7 pounds per square inch (psi) absolute, then the first outer channel pressure 80 is 1.2 times 14.7 psi, or about 17.64 psi absolute, which is about 2.94 psi gauge.

Referring now to FIGS. 4, 5, 6, 8, 9, 11 and 13, outer channel 66 has an annular partitioned volume 90, and impeller 44 has an impeller rotational direction 92 during small mass flow setting 70.

According to the present invention, annular partitioned volume 90 has a high speed rotating flow 94 during the small mass flow setting 70. The high speed rotating flow 94 has the same rotational direction as the impeller rotational direction 92 for improving compressor efficiency. According to the present invention, annular partitioned volume 90 has high speed rotating flow 94 for improving compressor efficiency and outer channel 66 has a higher first outer channel pressure 80 than the first inner channel pressure 78 during the small mass flow setting 70 for inhibiting backflow out of the impeller inlet 56, thereby inhibiting surge.

Referring now to FIGS. 3 through 6, 11, 13 and 15, in a number of embodiments of the present invention extended range compressor 42 includes an inlet volute 96. Inlet volute 96 has pressurized fluid or air 98 during the small mass flow setting 70. The pressurized air 98 is provided by the secondary compressor 68.

The pressurized air 98 from inlet volute 96 provides the higher first outer channel pressure 80 and the high speed rotating flow 94 in the annular partitioned volume 90 during the small mass flow setting 70 thereby inhibiting surge and providing a high efficiency compressor.

Referring now to FIGS. 5, 6, 8, 11, 13 and 16, according to the preferred embodiment of the present invention extended range compressor 42 further includes a flow regulating slot 100. Flow regulating slot 100 is located between the inlet volute 96 and the annular partitioned volume 90 for regulating flow of pressurized air 98 from the inlet volute 96 into the annular partitioned volume 90, thereby providing a uniform annular inlet flow for maximizing compressor efficiency and inhibiting surge.

In embodiments of the present invention having a flow regulating slot 100, annular partitioned volume 90 is in outer channel 66 during the small mass flow setting 70 and between the flow regulating slot 100 and the outer channel outlet area 104. The outer channel outlet area is shown in FIG. 10, and will be described in more detail later. In embodiments of the present invention not having a flow regulating slot 100, annular partitioned volume 90 is in outer channel 66 during the small mass flow setting 70 and includes the portion of outer channel 66 within twelve millimeters of the impeller inlet 56.

Referring now to FIGS. 8, 9, 10 and 16, flow regulating slot 100 further includes an imaginary slot curtain area or slot curtain area 102, and outer channel 66 includes an imaginary outer channel outlet area or outer channel outlet area 104 during the small mass flow setting 70. Slot curtain area 102 is located and shaped for providing the minimum curtain area across flow regulating slot 100. In the embodiment of the present invention illustrated in FIGS. 8 and 10, outer channel outlet area 104 is more than thirty percent larger than slot curtain area 102, thereby providing the higher first outer channel pressure 80 than the first inner channel pressure 78 and providing the high speed rotating flow 94 in annular partitioned volume 90 during the small mass flow setting 70, thereby inhibiting surge and maintaining a high efficiency compressor. In more detail, outer channel outlet area 104 is at least 1.30 times larger than slot curtain area 102 for providing a large pressurized outer channel outlet area for suppressing surge. Additionally, the smaller slot curtain area 102 provides a more uniform and axisymmetric flow in annular partitioned volume 90, and in more detail a more uniform flow in annular partitioned volume 90 through a full rotation around impeller axis of rotation 46.

Preferably, according to the present invention flow control vanes are not used to provide the high speed rotating flow 94 in annular partitioned volume 90. In more detail, outer channel 66 has a vaneless impeller inlet 186.

Referring now to FIGS. 8 and 10, impeller inlet 56 further includes an imaginary control area or control area 106. Control area 106 is the outer channel outlet area 104 during the small mass flow setting 70. In more detail, control area 106 is defined as the outer channel outlet area 104 as it exists during the small mass flow setting 70. The flow passageway leading to control area 106 is different for the large mass flow setting 76 than for the small mass flow setting 70. The flow passageway leading to the control area 106 is adjusted with the adjustable partition 74.

Referring now to FIGS. 6 through 14, extended range compressor 42 further includes a first inlet duct 108 and a second inlet duct 110. The second inlet duct 110 is in fluid communication with the control area 106 during the small mass flow setting 70. According to the present invention, the first inlet duct 108 is in fluid communication with the control area 106 during the large mass flow setting 76, and the adjustable partition 74 separates the first inlet duct 108 from the control area 106 during the small mass flow setting 70, thereby maintaining a higher first outer channel pressure 80 than the first inner channel pressure 78 during the small mass flow setting 70.

Referring now to FIGS. 3 through 12, according to an embodiment of the present invention, adjustable partition 74 includes an inner duct or tube 114 and a second outer channel inlet 116. Second outer channel inlet 116 is formed between first inlet duct 108 and inner duct 114.

Adjustable partition 74 further includes one or more movable sealing elements 118. The one or more movable sealing elements 118 have a first partition position 82 during the small mass flow setting 70 for blocking flow from outer channel 66 into inner channel 64 and maintaining a higher first outer channel pressure 80 than first inner channel pressure 78, and have a second partition position 84 during the large mass flow setting 76 for allowing flow of air 54 from first inlet duct 108 through control area 106. Referring now to FIGS. 7, 10 and 12, air 54 flows through second channel inlet 116 then control area 106 during the large mass flow setting 76. Referring now to FIG. 14, air 54 flows directly from first inlet duct 108 through control area 106 during the large mass flow setting 76.

Referring now to FIGS. 6 and 11, first partition position 82 prevents backflow of pressurized air 98 through second outer channel inlet 116, and thereby maintains a higher first outer channel pressure 80 than the first inner channel pressure 78 during the small mass flow setting 70. Adjustable partition 74 blocks second outer channel inlet 116 during small mass flow setting 70. Referring now to FIGS. 7, 12 and 14, second partition position 84 enables more air 54 to flow into impeller 44 during the large mass flow setting 76, thereby maximizing the small flow to large flow operational range of the extended range compressor 42.

The embodiments of the present invention shown in FIGS. 6 through 12 have a second outer channel inlet channel 116. According to the embodiments of present invention shown in FIGS. 6 through 12, the annular partitioned volume 90 has more than one inlet, flow regulating slot 100 being the first inlet during the small mass flow setting 70, and the second outer channel inlet 116 being the second inlet during the large mass flow setting 76.

In several embodiments of the present invention, the one or more movable sealing elements 118 are blown from the second partition position 84 to the first partition position 82 by the pressurized air 98 from the secondary compressor 68. Accordingly, turning on secondary compressor 68 causes the adjustable partition 74 to advance from the second partition position 84 to the first partition position 82.

In more detail, the adjustable partition 74 includes actuation means 120 for moving the one more movable sealing elements 118 from the large mass flow setting 76 and second partition position 84 to the small mass flow setting 70 and the first partition position 82. The actuation means may be the secondary compressor 68. The pressurized air 98 may alternatively be provided from a source other than the secondary compressor 68.

Referring now to FIG. 13, optionally an electrical solenoid actuator 122, and referring now to FIG. 14, optionally a pressurized air actuator 124 or other suitable actuation means 120 may be used to reposition the adjustable partition 74. The pressurized air actuator may optionally receive pressurized air from the secondary compressor 68, the compressor outlet having a compressor outlet pressure 149, or another pressurized air source.

The adjustable partition 74 shown in FIGS. 4 through 7 includes a ring seal 126 slidably mounted on tube 114. Ring seal 126 has fins or air catches 128. Pressurized air 98 from the secondary compressor 68 blows on fins 128 and/or on the ring seal 126 causing the ring seal 126 to advance from the second partition position 84 (shown in FIG. 7) to the first partition position 82 (shown in FIG. 6), thereby blocking flow from the outer channel 66 into the inner channel 64 and thereby providing a larger first outer channel pressure 80 than the first inner channel pressure 78 during the Small mass flow setting 70. In more detail, secondary compressor 68 blows ring seal 126 away from impeller 44 to seal off the second outer channel inlet 116.

When secondary compressor 68 is turned off, inflowing air 54 flowing through second outer channel inlet 116 causes the ring seal 126 to advance from the first partition position 82 to the second partition position 84, and thereby provide a larger and more streamline flow path into impeller 44 for air 54.

Referring now to FIGS. 11 through 14, the adjustable partition 74 now shown includes partition blades or aperture blades 130 having an outer channel side 132. Pressurized air 98 from the secondary compressor 68 blows on the outer channel side 132 of partition blades 130 causing the partition blades 130 to advance or pivot from the second partition position 84 to the first partition position 82.

And again the adjustable partition 74 shown in FIG. 13 optionally includes an electrical solenoid actuator 122, and in FIG. 14 a pressurized air actuator 124 for advancing the adjustable partition 74 from the second partition position 84 to the first partition position 82, and/or from first partition position 82 to second partition position 84.

Referring now to FIGS. 4, 8, 9, 10 and 12, impeller blades 48 have a leading edge 86. As stated earlier, rotation about impeller axis of rotation 46 of the leading edge 86 located the farthest upstream and extending into close proximity with the shroud 52 defines the impeller inlet 56. Impeller inlet 56 has an imaginary inlet surface area 58. Imaginary inlet surface area 58 extends 360 degrees all the way around the impeller axis of rotation 46. A portion of the imaginary inlet surface area 58 is cut away in FIG. 8 for illustration purposes only, and to show leading edge 86.

Adjustable partition 74 has a downstream boundary 134 during the small mass flow setting 70. The downstream boundary 134 is the edge of adjustable partition 74 between outer channel 66 and inner channel 64 that is closest to imaginary inlet surface area 58 during the small mass flow setting 70.

Adjustable partition 74 has an outlet wall thickness 136. In cases where the wall does not have a single edge that is closest to the imaginary inlet surface area 58, the downstream boundary 134 is located at the midspan of the outlet wall thickness 136 closest to the imaginary inlet surface area 58. Struts, wall sections or fins that do not separate first inner channel pressure 78 from first outer channel pressure 80 may be ignored.

Referring now to FIG. 10, adjustable partition 74 has an outlet clearance gap 138 during the small mass flow setting 70. Outlet clearance gap 138 is between the downstream boundary 134 and the imaginary inlet surface area 58. In more detail, the outlet clearance gap 138 is between the adjustable partition 74 and the impeller inlet 56 during the small mass flow setting 70. According to an embodiment of the present invention the outlet clearance gap 138 is less than three millimeters during the small mass flow setting 70 for maintaining a higher pressure in the outer channel 66 than the inner channel 64.

The outlet clearance gap 138 is typically constant or almost constant all the way around impeller axis of rotation 46, but may vary slightly due to tolerancing or to improve compressor performance. In cases where the clearance gap varies, the average value of the clearance gap is applied, and in more detail, the average outlet clearance gap 138 value is less than three millimeters. An average value need not be calculated if the outlet clearance gap 138 is less than three millimeters in all locations.

Some embodiments of the present invention have more than one outer channel 66 and/or more than one inner channel 64. Downstream boundary 134 is counted in all locations where adjustable partition 74 separates first outer channel pressure 80 from first inner channel pressure 78 during the small mass flow setting 70. Small gaps in the adjustable partition 74 may be ignored, such as gaps between partition blades 130.

Referring now to FIG. 8, leading edge 86 has a blade tip 162 in close proximity with shroud 52. Rotation about impeller axis 46 of blade tip 162 defines an impeller inlet diameter 164. Flow regulating slot 100 further includes a slot width 166. Slot curtain area 102 and slot width 166 are shaped for providing the minimum curtain area across flow regulating slot 100. In the embodiment of the present invention illustrated in FIGS. 4 through 13, the slot width 166 is less than twelve percent that of inlet diameter 164, thereby providing the high speed rotating flow 94 in the outer channel 66 during the small mass flow setting 70, and in more detail slot width 166 is no more than twelve percent larger than inlet diameter 164.

The slot width 166 is typically constant or almost constant all the way around impeller axis of rotation 46, but may vary slightly due to tolerancing or to improve compressor performance. In cases where the slot width varies, the average value of the slot width is applied, and in more detail, the average slot width 166 is less than twelve percent that of inlet diameter 164. An average value need not be calculated if the slot width 166 is less than twelve percent that of inlet diameter 164 in all locations.

On rare occasion the impeller blades 48 may have rounded tips. In these cases the impeller inlet diameter may be assumed to be the minimum shroud diameter adjacent to of the swept path of the leading edge 86. The swept path of the leading edge 86 defines an axial region located along impeller axis of rotation 46.

As stated before, control area 106 is equal to the outer channel outlet area 104 measured during the small mass flow setting 70. Referring again to FIGS. 8, 9 and 10, according to an embodiment of the present invention, the control area 106 is at least twenty percent as large as the imaginary inlet surface area 58, thereby providing an elevated pressure on a large enough percent of imaginary inlet surface area 58 to inhibit backflow and surge during the small mass flow setting 70. In more detail, control area 106 is more than 0.20 times the size of inlet surface area 58.

Referring now to FIG. 3, extended range compressor 42 has an overall mass flow 142. Referring now to FIGS. 3, 6, 11 and 13, during the small mass flow setting 70, first inlet duct 108 has a first inlet mass flow 144, and second inlet duct 110 has a second inlet mass flow 146. Secondary compressor 68 further providing pressurized air 98 in second inlet duct 110. According to an embodiment of the present invention, the second inlet mass flow 146 is at least twenty percent as large as the overall mass flow 142 during the small mass flow setting 70 thereby providing a large enough boosted mass flow to inhibit backflow of air 54 out of impeller inlet 56 and to prevent surge during the small mass flow setting 70. In more detail, second inlet mass flow 146 is more than 0.20 times the size of the overall mass flow 142.

Referring now to FIGS. 3, 6, 11 and 13, extended range compressor 42 has an overall pressure ratio 148 and a compressor outlet pressure 149. The overall pressure ratio 148 is equal to the absolute stagnation outlet pressure 149 divided by the absolute stagnation inner channel inlet pressure 151.

Secondary compressor 68 has a secondary compressor inlet pressure 69 and a secondary compressor pressure ratio 150. The secondary compressor pressure ratio 150 is equal to the absolute stagnation pressure of the pressurized air 98 from the secondary compressor 68 divided by the absolute stagnation secondary compressor inlet pressure 69.

The overall pressure ratio 148 and the secondary compressor pressure ratio 150 are calculated using absolute stagnation pressures. Gauge pressure is equal to absolute stagnation pressure minus atmospheric pressure, where atmospheric pressure has a value of about 14.7 pounds per square inch (psi). It should be noted that first inner channel pressure 78 and first outer channel pressure 80 are static pressures.

According to an embodiment of the present invention, the gauge stagnation pressure of pressurized air 98 is at least twenty percent as large as the gauge stagnation pressure of compressor outlet pressure 149. In more detail, the gauge stagnation pressure of pressurized air 98 is more than 0.20 times the gauge outlet pressure 149.

For example, if atmospheric pressure is 14.7 psi and if the overall pressure ratio 148 is 2.5 then the compressor outlet pressure 149 has an absolute stagnation value of 36.75 psi and a gauge value of 22.05 psi. The pressurized air 98 from the secondary compressor 68 is then more than 0.2 times 22.05 psi, or more than 4.41 psi gauge.

Figure 15:
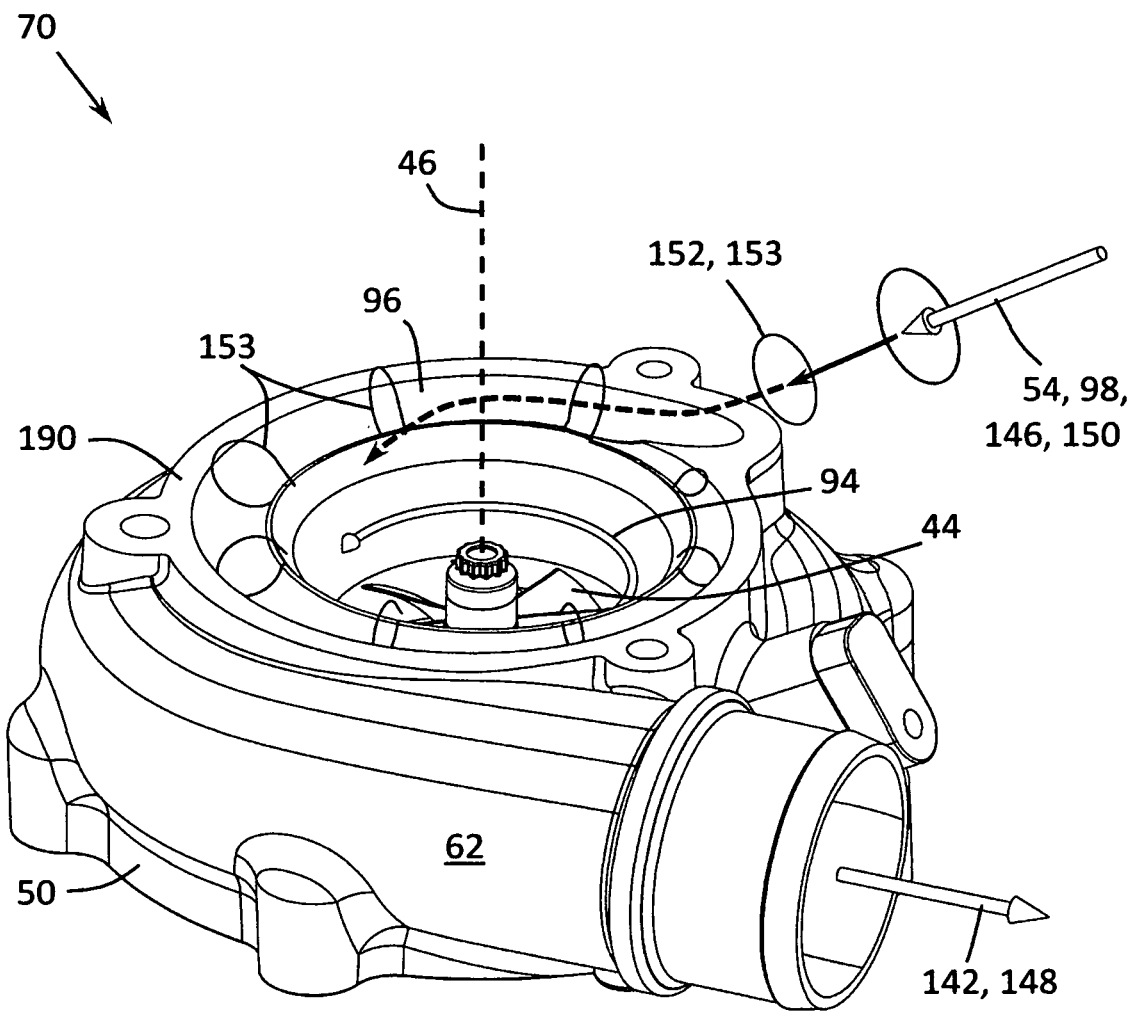
FIG. 15 is similar to FIG. 3, but with the valve cover removed.

Referring now to FIGS. 3, 8, 10 and 15, inlet volute 96 has a minimum volute inlet cross sectional area 152 upstream of flow regulating slot 100. According to an embodiment of the present invention, adjustable partition 74 provides a control area 106 more than twice as large as the minimum volute inlet cross sectional area 152 during the small mass flow setting 70, thereby providing pressurized flow over a large enough portion of the impeller inlet to inhibit back flow out of the impeller and to prevent surge. Hoop curves 153 shown in FIG. 15 are intended to illustrate the cross sectional shape of the inlet volute 96.

Referring now to FIGS. 8, 9 and 10, impeller blades 48 have a leading edge 86 and a trailing edge 88. Rotation about impeller axis of rotation 46 of the leading edge 86 located the farthest upstream and extending into close proximity with the shroud 52 defines the impeller inlet 56 and an imaginary inlet surface area 58. Imaginary inlet surface area 58 may have a conical, flat or curved surface depending on the shape of leading edge 86.

Imaginary inlet surface area 58 extends 360 degrees all the way around the impeller axis of rotation 46. A portion of the imaginary inlet surface area is cut away in FIG. 8 for illustration purposes only, and to show leading edge 86.

In most cases impeller 44 has a nacelle or hub 140, and in these cases the leading edge 86 of the impeller blades 48 extend outwardly from the hub 140. Accordingly, the imaginary inlet surface area 58 typically has a central hole. The area of the hole is not included in the imaginary surface area 58.

Adjustable partition 74 has a downstream boundary 134 during the small mass flow setting 70. The downstream boundary 134 is the edge of the adjustable partition 74 between outer channel 66 and inner channel 64 that is closest to imaginary inlet surface area 58 during the small mass flow setting 70.

Adjustable partition 74 has an outlet wall thickness 136. In cases where the wall does not have a single edge that is closest to the imaginary inlet surface area 58, the downstream boundary 134 is located at the midspan of the outlet wall thickness 136 closest to imaginary inlet surface area 58. Struts, wall sections or fins that do not separate first inner channel pressure 78 from first outer channel pressure 80 may be ignored.

Downstream boundary 134 and imaginary inlet surface area 58 are joined by an imaginary curtain or curtain 154 having a minimum curtain area 156. Curtain 154 is shaped for providing the minimum curtain area 156 between downstream boundary 134 and imaginary inlet surface 58.

In most cases curtain 154 and minimum curtain area 156 can be reasonably approximated by extruding downstream boundary 134 axially into contact with imaginary inlet surface area 58. The axial orientation is established by the impeller axis of rotation 46.

Curtain 154 has a low pressure side 158 and a high pressure side 160. Low pressure side 158 faces towards first inner channel pressure 78, and the high pressure side 160 faces towards first outer channel pressure 80.

Inner channel 64 has an imaginary inner channel outlet area or inner channel outlet area 112. In more detail, inner channel outlet area 112 is defined as the inner channel outlet area 112 as it exists during the small mass flow setting 70. Inner channel outlet area 112 is the portion of imaginary inlet surface area 58 that is on the low pressure side 158 of imaginary curtain 154 during the small mass flow setting 70. Similarly, outer channel 66 has an imaginary outer channel outlet area or outer channel outlet area 104. Outer channel outlet area 104 is the portion of imaginary inlet surface 58 that is on the high pressure side 160 of imaginary curtain 154 during the small mass flow setting 70.

In some embodiments of the present invention the channels may be subdivided by struts, fins or walls. All of the outer channel outlet areas flowing from the same secondary compressor 68 or having a common pressurized air 98 pressure are summed for calculation of the outer channel outlet area 104.

Similarly, all of the inner channel outlet areas having a common upstream pressure are summed for calculation of the inner channel outlet area 112. In most cases the inner channel receives air from the atmosphere without any intermediary compression. On rare occasion a third air compressor may be used to elevate the pressure of the inner channel flow. Accordingly, the common upstream pressure for the inner channels is located downstream of any third compressor if used.

According to the present invention, the extended range compressor may have more than two concentric inlet ducts. In general, a large enough compressor range can be obtained with just the inner duct and one outer duct. The cost and complexity of adding a third duct surrounding the first outer duct is generally not cost effective, but in some applications may be worthwhile. In embodiments of the present invention having three or more inlet channels where the upstream pressures are different for each of the channels, the channel outlet areas are calculated individually for each channel or flow stream having a unique upstream pressure.

Referring now to FIG. 10, impeller 44 further includes an imaginary control area or control area 106. Control area 106 is the outer channel outlet area 104 during the small mass flow setting 70. In more detail, control area 106 is the outer channel outlet area 104 as it exists during the small mass flow setting 70. The flow passageway leading to control area 106 is different for the large mass flow setting 76 than for the small mass flow setting 70 but the size and location of control area 106 remains the same. The flow passageway leading to the control area 106 is adjusted with the adjustable partition 74.

Rotation about impeller axis 46 of the outer end of leading edge 86 or blade tip 162 defines an impeller inlet diameter 164. Referring now to the embodiments of the present invention shown in FIGS. 6, 9, 10, 11 and 13, downstream boundary 134 is located inside of impeller inlet diameter 164. Control area 106 is located between impeller inlet diameter 164 and downstream boundary 134.

Referring now to FIG. 13, small gaps in downstream boundary 134 between partition blades 130 may be ignored.

Preferably slot curtain area 102, outer channel outlet area 104 and inner channel outlet area 112 are circular in shape, however some embodiments of the present invention have non circular shapes.

Referring now to FIGS. 9, 10 and 15, as just described, extended range compressor 42 has a minimum volute inlet cross sectional area 152. Small mass flow setting 70 has a first effective impeller inlet area. The first effective impeller inlet area is the sum of the inner channel outlet area 112 and the minimum volute inlet cross sectional area 152.

The large mass flow setting 76 has a second effective impeller inlet area. The second effective impeller inlet area is the sum of the inner channel outlet area 112 and the control area 106.

According to an embodiment of the present invention, the second effective impeller inlet area is more than twenty percent larger than the first effective impeller inlet area, thereby providing a large flow capacity compressor.

In more detail, extended range compressor 42 also has a large mass flow setting 76. Large mass flow setting 76 has a second partition position 84 for providing an increased mass flow of fluid 54 into the impeller 44 during the large mass flow setting 76. The large second effective impeller inlet area provides the large flow capacity of the large mass flow setting 76.

As described above, extended range compressor 42 an inner channel outlet area 112. According to an embodiment of the present invention, inner channel outlet area 112 and control area 106 are in fluid communication with first inlet duct 108 during the large mass flow setting 76, and the outer channel 66 and control area 106 are separated from the first inlet duct 108 by the adjustable partition 74 during the small mass flow setting 70, thereby maintaining a larger pressure in outer channel 66 than the inner channel 64 during the small mass flow setting 70.

Impeller inlet 56 is separated from downstream boundary 134 by an imaginary curtain 154 having a minimum curtain area 156 during small mass flow setting 70. Minimum curtain area 156 is relatively small, and is ignored in the case of this embodiment of the present invention. Leakage through adjustable partition 74 and leakage between partition blades 130 is also ignored in the case of this embodiment of the present invention.

According to the present invention, impeller 44 may have more than two concentric inlet ducts. In general, a large enough compressor range can be obtained with just the inner duct and one outer duct. The cost and complexity of adding a third duct surrounding the first outer duct is generally not cost effective, but in some applications may be worthwhile.

In the case of a turbocharger, fluid 54 is typically air or air mixed with recirculated exhaust gas commonly referred to as EGR. The fluid entering second inlet duct 110 may be different than the fluid entering first inlet duct 108.

Referring now to FIGS. 6, 11, 13 and 18, the extended range compressor 42 shown in FIGS. 3, 4, 7, 12 and 15, includes a casing 50 and a valve cover 188 having an attachment surface 190 shared with casing 50. Preferably attachment surface 190 bisects inlet volute 96 thereby providing for casting mold release and minimized manufacturing cost.

According to the present invention flow regulating slot 100 is formed between casing 50 and a flow regulating slot surface 290, thereby providing a low cost method of manufacturing a small precision slot. Flow regulating slot surface 290 may be formed directly in valve cover 188 or be formed in a blade retainer 268 or another insert or part attached to valve cover 188. Flow regulating slot surface 290 and blade retainer 268 will be described in more detail later on.

Figure 4:
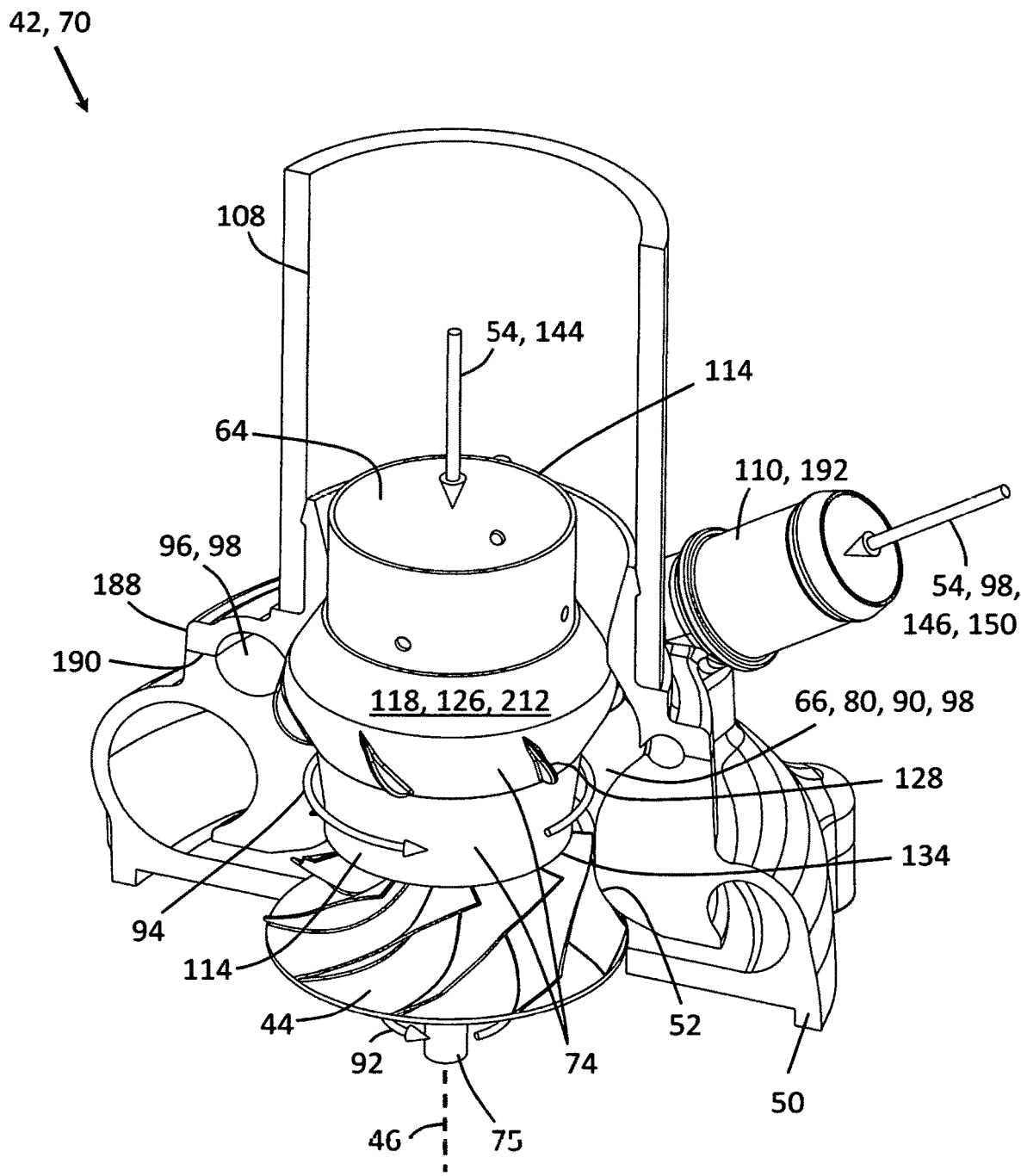
FIG. 4 is similar to FIG. 3 but shows the compressor housing in section view to expose the outer channel.

Referring now to FIGS. 3, 4 and 15, second duct 110 is preferably bent away from attachment surface 190 and includes a full round cast inlet 192. The Figs. show a hose barb full round cast inlet 192 where the barb is a single cast part located to one side of attachment face 190, thereby providing a robust barb that is inexpensive to manufacture.

Figure 17:
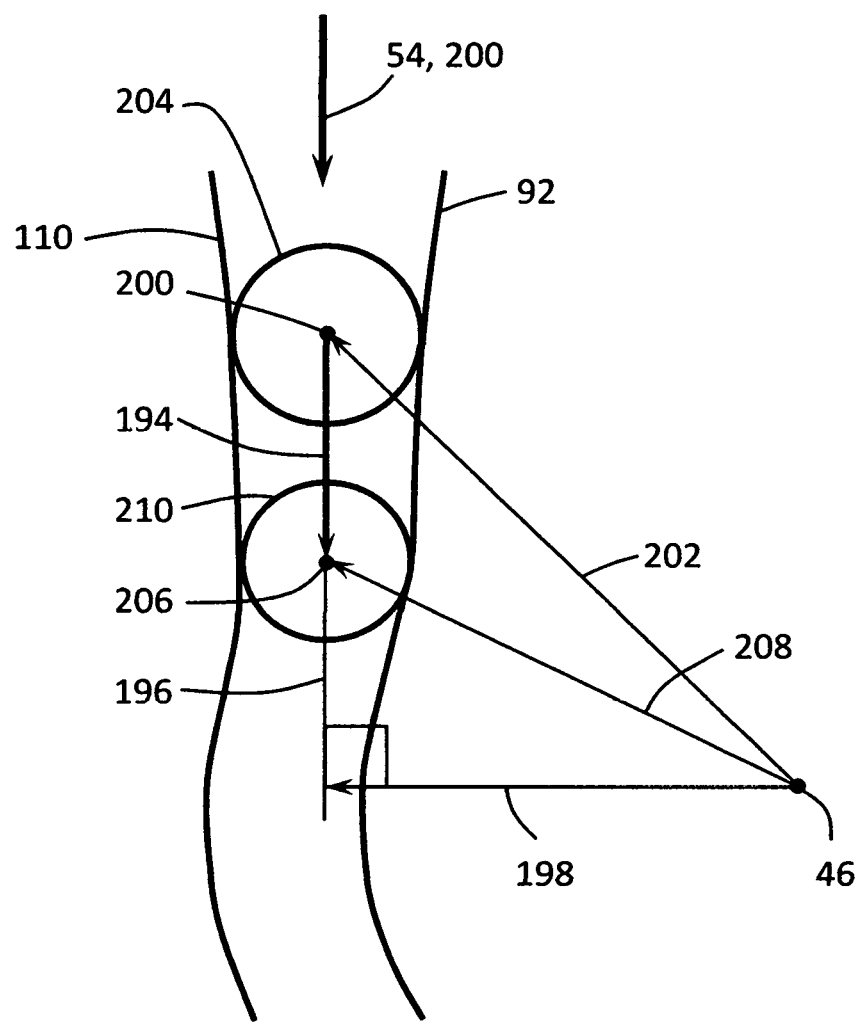
FIG. 17 is intended to illustrate the second inlet duct alignment with the inlet volute.

Referring now to FIGS. 3, 15 and 17, second inlet duct 110 is aligned for providing the high speed rotating flow 94 in annular partitioned volume 90. Second inlet duct 110 has an inlet vector 194. In more detail inlet vector 194 represents the direction of flow near the outlet of second inlet duct 110 or just upstream of flow regulating slot 100.

FIG. 17 is intended to schematically illustrate second inlet duct 110 by representing each sides of the inlet duct with a solid line. Inlet vector 194 also defines an imaginary inlet line 196. Imaginary inlet line 196 is aligned with and extends from inlet vector 194.

Imaginary inlet line 196 is spaced apart from impeller axis of rotation 46 by a tangential distance 198. Tangential distance 198 is the minimum distance between imaginary inlet line 196 and the impeller axis of rotation 46.

Figure 16:
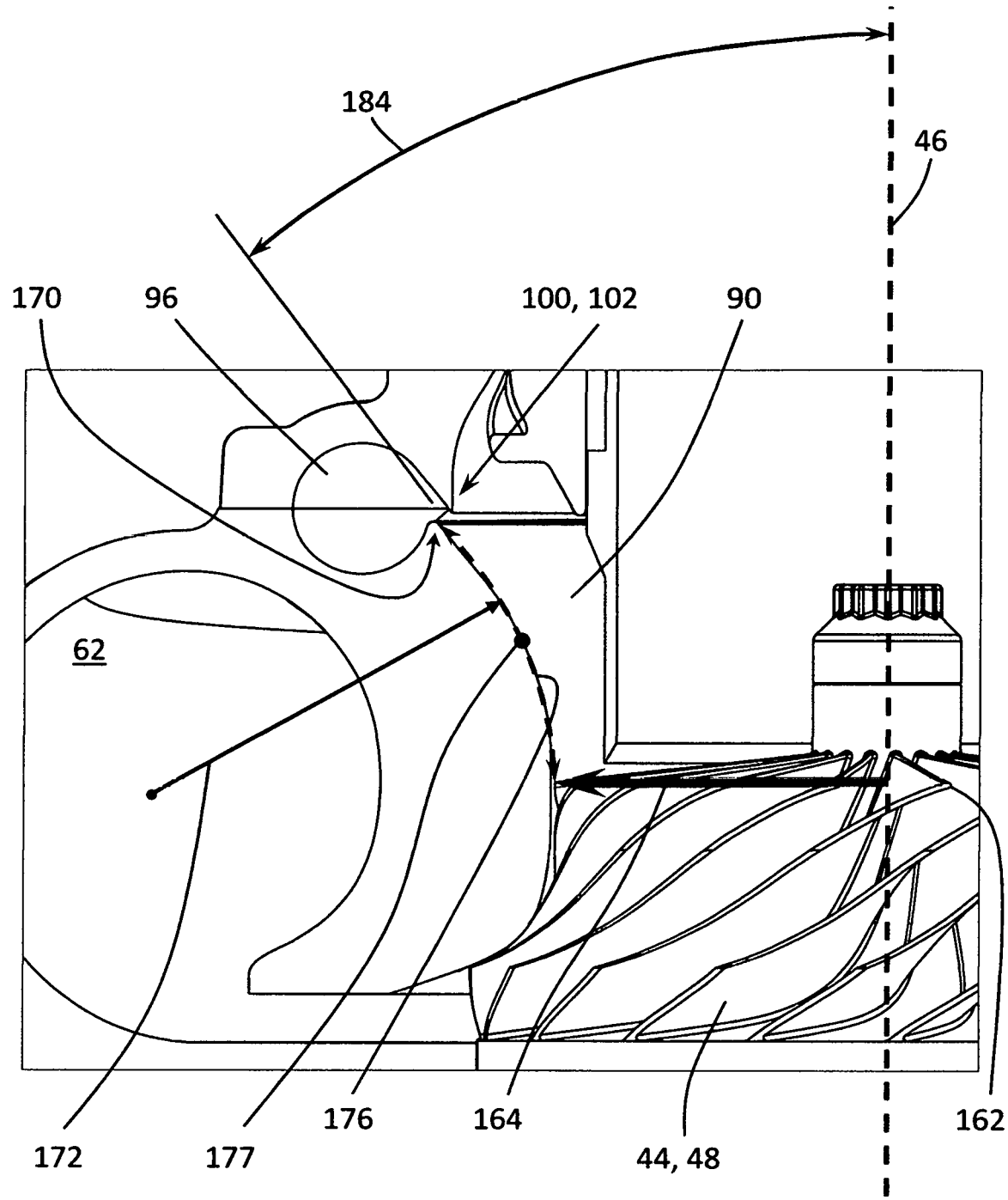
FIG. 16 is intended to illustrate the shape of the annular partitioned volume.

According to the present invention, tangential distance 198 is more than 0.50 times the impeller inlet diameter 164 and tangential distance 198 is less than 1.30 times the impeller inlet diameter 164, thereby maximizing the rotational velocity of said high speed rotating flow 94. The radius of impeller inlet diameter 164 is shown in FIG. 16.

In more detail, inlet vector 194 has a starting point 200. Starting point 200 has a starting distance 202 from the impeller axis of rotation 46. The starting distance 202 is 1.4 times the tangential distance 198.

FIG. 17 shows a first imaginary sphere 204. Starting point 200 is the origin point of first imaginary sphere 204. First imaginary sphere 204 has the largest size fitting inside of the second inlet duct 110 at the starting distance 202. In more detail imaginary sphere 204 is the largest size sphere that will fit inside of pressurized second inlet duct 110 at starting distance 202 from impeller axis of rotation 46.

Inlet vector 194 also has an ending point 206. Ending point 206 has an ending distance 208 from impeller axis of rotation 46. The ending distance 114 is 1.1 times the tangential distance 198.

FIG. 17 also shows a second imaginary sphere 210. Ending point 206 is the origin point of second imaginary sphere 210. Second imaginary sphere 210 has the largest size fitting inside of second inlet duct 110 at the ending distance 208. In more detail imaginary sphere 210 is the largest size sphere that will fit inside of second inlet duct 110 at ending distance 114 from impeller axis of rotation 46.

According to the present invention, inlet vector 194 extends from starting point 200 to ending point 206 and imaginary inlet line 196 is aligned with and extends from inlet vector 194.

In some embodiments of the present invention first imaginary sphere 204 may occupy a range of locations at starting distance 202 from the impeller axis of rotation 46. Specifically, the maximum size of first imaginary sphere 204 that can fit inside of second inlet duct 110 may be free to shift slightly from side to side inside of the inlet duct 110. When a range of starting point locations is possible, the location of starting point 200 is defined as the middle location of the range of possible locations. Similarly, when a range of ending point locations is possible, the location of ending point 206 is defined as the middle location of the range of possible locations.

Referring now to FIGS. 8 and 16, rotation of blade tip 162 about impeller axis of rotation 46 defines an impeller inlet diameter 164, with the radius of the inlet diameter shown in FIG. 16. Flow regulating slot 100 has a slot curtain area 102. Annular partitioned volume 90 further has an outer wall 176 having a midpoint 177. Slot curtain area 102 has an outer slot diameter 170. The outer slot diameter 170 is adjacent to outer wall 176. Midpoint 177 is also located on outer wall 176. Midpoint 177 is equally distant from the outer slot diameter 170 and the impeller inlet diameter 164.

Annular partitioned volume 90 further has a radius of curvature 172. Radius of curvature 172 intersects or passes through the outer edge of inlet diameter 164, midpoint 177 and the outer slot diameter 170.

According to the present invention, radius of curvature 172 is more than 0.25 times the impeller inlet diameter 164, thereby enabling a higher first outer channel pressure 80 than first inner channel pressure 78 during the small mass flow setting 70 without incurring excessive aerodynamic loss.

The outer slot diameter 170 is typically constant or almost constant all the way around impeller axis of rotation 46, but may vary slightly due to tolerancing or to improve compressor performance. In cases where the outer slot diameter varies, the average value of the outer slot diameter is applied, and in more detail, radius of curvature 172 intersects or passes through the outer edge of inlet diameter 164, midpoint 177 and the average outer slot diameter 170.

Preferably the outer wall 176 of annular partitioned volume 90 has the same shape and curvature all the way around impeller axis of rotation 46, but may vary due to tolerancing or to improve compressor performance.

Flow regulating slot 100 further has a slot flow angle 184 measured between the impeller axis of rotation 46 and the centerline of flow regulating slot 100. According to an embodiment of the present invention, flow angle 184 is less than 70 degrees, thereby minimizing aerodynamic losses.

Referring now to FIGS. 6, 11, 12, 13 and 14, according to a number of embodiments of the present invention, secondary compressor 68 includes an electric motor drive 72.

Secondary compressor 68 may optionally be driven by other means such as a gear or belt drive on its own or combined with an electric motor. Secondary compressor may alternatively be a small turbocharger.

FIG. 3 shows a turbocharger 40 according to the present invention having a turbine 73 and a drive shaft 75. During the small mass flow setting 70, power for compressing air 54 is provided by both the turbine 73 of turbocharger 40 and secondary compressor 68. Accordingly, the added power from secondary compressor 68 provides a faster responding turbocharger.

During a small mass flow setting 70, turbine 73 has a first shaft power for driving impeller 44, and the secondary compressor 68 has a second shaft power. According to an embodiment of the present invention second shaft power is more twenty percent as large as first shaft power, and in more detail second the shaft power is at least 0.20 times as large as the first shaft power.

The impeller 44 of the present invention is typically driven by the turbine 73 of a turbocharger 40 but may alternatively be driven by other means such as an electric motor on its own or combined with the turbine of a turbocharger, a gear or belt drive on its own or combined with the turbine of a turbocharger, or alternative functional means. The impeller 44 of the present invention may also be part of a gas turbine engine.

In some embodiments of the present invention the inner channel 64 may receive pressurized air from a third compressor, but at a lower pressure than provided by secondary compressor 68.

Referring now to FIGS. 4, 6 and 7, ring seal 126 has a conical outer upstream surface 212 and a conical outer downstream surface 214, and valve cover 188 has a valve seat 216. Conical outer upstream surface 212 forms a sealing contact 218 with valve seat 216 during the first partition position 82. Ring seal 126 is at its furthest position from impeller 44 during the first position 82, and in more detail sealing contact 218 between conical outer upstream surface 212 and valve seat 216 defines the maximum distance between impeller 44 and ring seal 126.

Referring now to FIG. 7, ring seal 126 is at its closest position to impeller 44 and farthest from valve seat 216 during the second partition position 84. In more detail, conical outer upstream surface 212 is spaced apart from valve seat 216 during the second partition position 84, thereby opening the second outer channel inlet 116 for flow of air 54 from first inlet duct 108 through outer channel 66 and into impeller 44, passing through control area 106. Flow of air 54 is around the outside of ring seal 126 during the second partition position 84.

Conical outer downstream surface 214 is also spaced apart from outer wall 176 during the second partition position 84. Second channel 66 has a cross sectional flow area 220 during the second partition position 84. According to an embodiment of the present invention, cross sectional flow area 220 is more than sixty percent (60 percent) of control area 106 in channel 66, for maximizing air flow during the second partition position 84 and the large mass flow setting 76, thereby maximizing the small flow to large flow operational range of the compressor.

Ring seal 126 includes one or more mechanical stops 222 for preventing travel towards impeller 44 beyond the second partition position 84 of ring seal 126.

FIGS. 6 and 7 show matching ridges 224 formed on ring seal 126 and tube 114 serving as mechanical stops 222. In more detail, the matching ridges 224 prevent travel of ring seal 126 closer to impeller 44 than the second partition position 84 of ring seal 126.

Axial travel of ring seal 126 is bound by matching ridges 224 during the second partition position 84, and by sealing contact 218 during the first partition position 82.

Referring now to FIGS. 5, 6 and 7, the ridge farthest from the impeller or farthest upstream is formed by a step extending inwardly from the ring seal 126. The ridge closest to the impeller or farthest downstream is formed by a step extending outwardly from the tube 114. The outward step causes the tube wall thickness to be larger. The tube wall thickness is reduced downstream of the step so that the tube wall is thinner immediately upstream of the impeller, thereby minimizing blockage of the impeller inlet. The ring seal 126 has a small diameter cylindrical surface upstream of the matching ridges 224 that slides on a first mating tube surface, and the ring seal 126 has a large diameter cylindrical surface downstream of the matching ridges 224 that slides on a second mating tube surface.

Referring now to FIGS. 3 and 8, tube 114 may optionally be secured in valve cover 118 with one or more pins or fasteners 226, preferably passing through fins 228 formed in valve cover 188. Tube 114 may optionally be press fit, welded, brazed, soldered or glued to fins 228.

FIGS. 11 and 12 show fins formed on tube or duct 114 that fit in matching slots in valve cover 118.

Referring now to FIGS. 7 and 10, valve seat 216 has an inner seat diameter 230. Inner seat diameter 230 is more than sixty percent (60 percent) of the impeller inlet diameter 164 for maximizing air flow during the second partition position 84 and the large mass flow setting 76, thereby maximizing the small flow to large flow operational range of the compressor.

Referring now to FIGS. 11 through 14 and FIG. 18, the adjustable partition 74 includes an adjustable area aperture or adjustable aperture 232 located in the valve cover or other suitable housing 188. The adjustable aperture 232 also includes a plurality of partition blades 130 and an impeller axis of rotation 46.

The partition blades 130 have a hinge joint 234 for pivotally connecting to the valve cover 188. When assembled, the partition blades 130 collectively form an aperture around the impeller axis of rotation 46.

In more detail, adjustable aperture 232 has a retaining socket 235 and a plurality of partition blades 130. The partition blades have a pin end 237. The pin end 237 is pivotally mounted in the retaining socket 235.

The retaining socket 235 has a torus raceway or torus half 238 for pivotally retaining the partition blades 130. The torus raceway 238 further has an opening for extension of the partition blades 130 outside of the raceway. In more detail, the torus raceway is like the letter C, with the opening facing the impeller axis of rotation 46.

According to the present invention, the adjustable aperture 232 further includes an assembly clearance 242 between the torus raceway 238 and the pin end 237, thereby providing clearance for pivotal motion of the partition blades 130 in the torus raceway 238 without binding.

Adjustable aperture 232 has a minimum opening aperture 244 and a maximum opening aperture 246. According to the present invention, an assembly clearance 242 provides enough clearance for pivoting of the aperture blades 130 from minimum opening aperture 244 to the maximum opening aperture 246 without binding.

First partition position 82 has a minimum opening aperture 244, and second partition position 84 has a maximum opening aperture 246 in the embodiments of the present invention shown in FIGS. 11 through 14.

Adjustable aperture 232 is shown in extended range compressor 42, but may be used for other purposes and other applications. As one of many examples, adjustable aperture 232 may be used with a ported shroud compressor, and in more detail for recirculating air from the shroud or compressor outlet instead of using secondary compressor 68 or electric motor drive 72. As another example, the adjustable aperture 232 may be used to reduce the inlet diameter of impeller 44, and in more detail with control area 106 not receiving air 54 from secondary compressor 68, a ported shroud, or the compressor outlet. The adjustable aperture may be used to reduce impeller inlet diameter without including additional air flow from an outer channel.

The hinge joint 234 includes a blade half 236 and a torus half 238. The torus half 238 is in valve cover 188. According to the present invention, torus half 238 further has a revolved contact surface 240 for joining with the plurality of aperture blades 130. The revolved contact surface 240 is revolved around central axis 46. The revolved contact surface 240 can me machined at low cost by a laith that revolve cuts the surface about central axis 46.

The adjustable area aperture 232 further includes an assembly clearance 242 between the torus half 238 and the blade half 236 for preventing binding of the blade half 236 with the torus half 238 during pivotal motion of the aperture blades 130. It should be noted that a curved hinge pin cannot rotate in a match fit curved socket. According to the present invention, the assembly clearance 242 provides enough clearance for pivoting of the aperture blades 130 from the first partition position 82 to the second partition position 84 without binding.

In more detail, the adjustable area aperture 232 further has a minimum aperture opening 244 having a first assembly clearance 248, and a maximum aperture opening 246 having a second assembly clearance 250.

The first assembly clearance 248 is greater than zero and the second assembly clearance 250 is greater than zero, thereby enabling the aperture blades 130 to pivot from the minimum aperture opening 244 to the maximum aperture opening 246 without binding, and therefore also from the first partition position 82 to the second partition position 84 without binding.

The assembly clearance 242 should be no larger than necessary for preventing binding or free travel of the aperture blades 130. According to the present invention the first assembly clearance 248 is less than 2.0 percent of impeller inlet diameter 164, and the second assembly clearance 250 is less than 2.0 percent of the impeller inlet diameter 164.

Minimum aperture opening 244 has a minimum opening diameter 252 inside of aperture blades 130 encircling central axis 46.

According to an embodiment of the present invention, the first assembly clearance 248 is less than 1.5 percent of the minimum opening diameter 252, and the second assembly clearance 250 is less than 1.5 percent of the minimum opening diameter 252.

The minimum opening diameter 252 is typically constant or almost constant all the way around impeller axis of rotation 46, but may vary slightly due to tolerancing or to improve compressor performance. In cases where the minimum opening diameter varies, the average value of the minimum opening diameter is applied, and in more detail, the first assembly clearance 248 is less than 1.5 percent of the average minimum opening diameter 252, and the second assembly clearance 250 is less than 1.5 percent of the average minimum opening diameter 252.

The adjustable aperture 232 further has an imaginary aperture reference plane 254. The imaginary aperture reference plane 254 extending radially outward from the central axis 46.

The torus half 238 also has a torus contact curve 256. The intersection of the revolved contact surface 240 and the imaginary aperture reference plane 254 defines the torus contact curve 256.

According to an embodiment of the present invention, the torus contact curve 256 is the same at all rotational locations about the central axis 46, thereby providing low cost machining of the torus contact surface with a laith.

According to an embodiment of the present invention, the torus contact curve 256 has a round section 257, thereby providing a close fitting hinge joint with a small permissible assembly clearance 242. In more detail, a portion of the revolved contact surface 240 may be machined on a laith with a round cutting tool.

According to an embodiment of the present invention, the revolved contact surface has a hinge pin diameter 258. According to the present invention the hinge pin diameter 258 is more than 0.10 times the impeller inlet diameter 164, thereby providing a large hinge pin diameter 258 to assembly clearance 242 ratio.

Minimum aperture opening 244 has a minimum opening diameter 252 as described previously. According to the present invention the hinge pin diameter 258 is more than 0.12 times minimum opening diameter 252, thereby providing a large hinge pin diameter 258 to assembly clearance 242 ratio.

The hinge pin diameter 258 is typically constant or almost constant, but may vary slightly due to tolerancing or to prevent binding. In cases where the hinge pin diameter varies, the average value of the hinge pin diameter is applied, and in more detail, the average hinge pin diameter 258 is more than 0.12 times minimum opening diameter 252, thereby providing a large hinge pin diameter 258 to assembly clearance 242 ratio. An average value need not be calculated if the hinge pin diameter 258 is more than 0.12 times the minimum opening diameter 252 in all locations.

Figure 18:
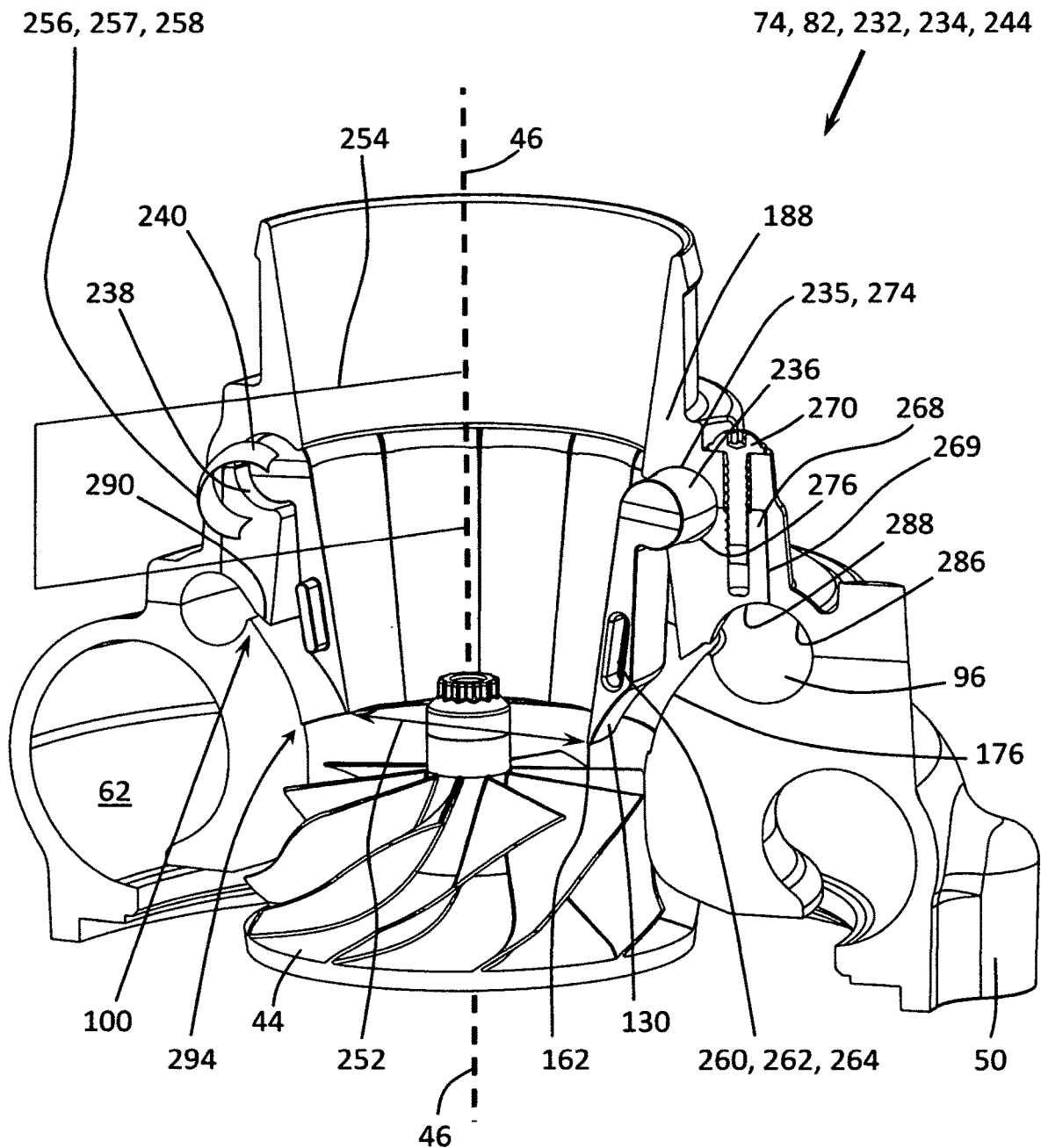
FIG. 18 is intended to illustrate an adjustable partition having an adjustable aperture.
Figure 19:
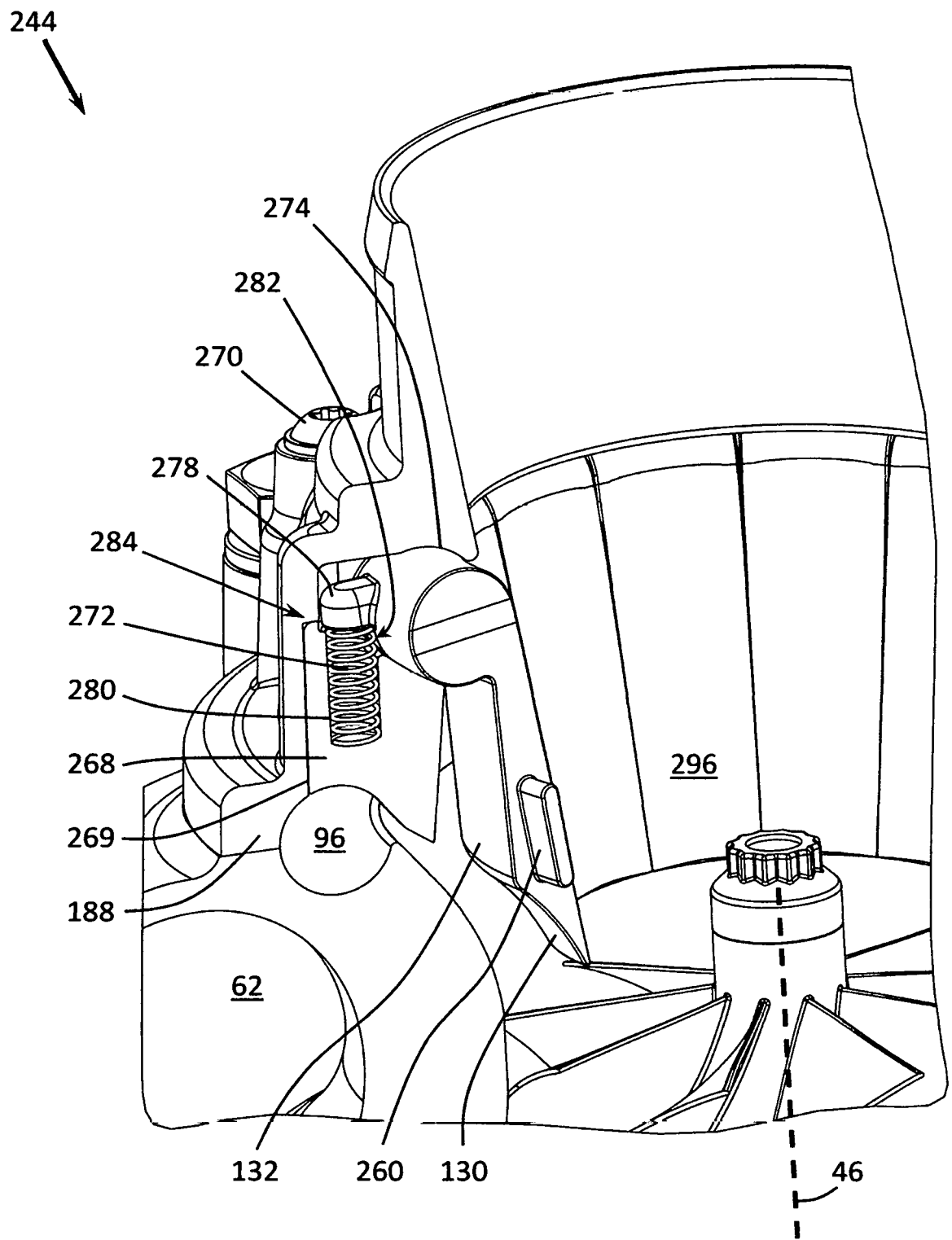
FIG. 19 is intended to illustrate the return spring assembly for the adjustable aperture.

Referring now to FIGS. 18 and 19, partition blades 130 further include alignment guides 260 for alignment of adjacent partition blades 130. In more detail, alignment guides 260 between two adjacent partition blades 130 cause the two blades to pivot by equal amounts. Alignment guides 260 between all of the partition blades 130 are provided for all of the partition blades 130 to pivot in unison for symmetrical opening and closing the adjustable aperture 232. A pin or fin in socket alignment guide 262 is shown in FIGS. 18 and 19.

The alignment guides 260 may be used to provide a variable aperture 264, and in more detail by forming a partition at a third partition position, the third partition position being between the first partition position 82 and the second partition position 84. Longer fins may be used to minimize leakage between the blades during the third partition position. Optionally, adjacent blades may overlap to minimize leakage between the partition blades during the third partition position.

Referring now to FIGS. 11, 12, 18 and 19, valve cover 188 further includes a blade retainer 268 for retaining partition blades 130 in the valve cover 188. Preferably blade retainer 268 is assembled into the inside of valve cover 188 and secured by retainer fasteners 270. In more detail, the blade retainer 268 is assembled into the valve cover 188 from the impeller 44 side of the valve cover. Fasteners 270 preferably are inserted through the outside of valve cover 188 and thread into blade retainer 268. Optionally, fasteners 270 are inserted through the blade retainer 268 and thread into valve cover 188.

In the embodiment of the present invention shown in FIG. 18, valve cover 188 includes a cover raceway 274, and blade retainer 268 includes a retainer raceway 276 for removably retaining partition blades 130 in valve cover 188. Valve cover 188 includes a blade retainer socket 269. Blade retainer 268 is assembled into blade retainer socket 269 in valve cover 188. Inlet volute 96 includes a volute cover surface 286 formed in valve cover 188, and a volute retainer surface 288 formed in blade retainer 268 thereby providing an aerodynamic volute and a small and compact valve cover assembly.

In the embodiment of the present invention shown in FIGS. 11 through 14 and FIG. 18, inlet volute 96 includes a volute cover surface 286, and a volute retainer surface 288. Blade retainer 268 further includes a flow regulating slot surface 290.

Referring now to FIGS. 18 and 19, one or more return springs 272 may optionally be used for moving the partition blades 130 to the maximum opening aperture setting 246. FIG. 19 shows return springs 272 fully compressed and ready to move the partition blades 130 from minimum opening aperature 244 (shown) to the maximum opening aperture 246. In the embodiment shown in FIG. 19, partition blades 130 have a spring seat or spring seat tab 278 and blade retainer 268 has a spring socket 280. The spring sockets may optionally be formed in valve cover 188.

Optionally, partition blades 130 have a spring clearance cutaway 282, thereby enabling a smaller and more compact valve cover design. Similarly, blade retainer 268 optionally has a spring seat clearance cutaway 284, thereby enabling a smaller and more compact valve cover design.

In the embodiment of the present invention shown in FIG. 19, spring sockets 280 are parallel to central axis 46, thereby enabling a smaller and more compact valve cover design and providing lower cost machining. Preferably spring sockets 280 are not through holes so that the spring is retained in the socket.

According to the embodiment of the present invention shown in FIGS. 11, 12, 14, 18 and 19, one or more return springs 272 are located on the outer channel side 132 of partition blades 130. The one or more return springs 272 are also located between inlet volute 96 and spring seat 278.

Additionally, according to an embodiment of the present invention, not all of the partition blades 130 include spring seats tabs 278 and return springs 272. Alignment guides 260 provide for synchronized movement of partition blades 130 not having spring seats tabs 278 and return springs 272.

Referring now to FIGS. 12 and 14, partition blades 130 have an outer channel side 132, and the annular partitioned volume 90 has an outer wall 176. According to an embodiment of the present invention, at least a portion of the outer channel side 132 has a close or match fit 292 with outer wall 176 during the second partition position 84. In more detail, a portion of the the outer channel side surface 132 closely follows the outer wall surface 176 during the second partition position 84, and/or during the maximum opening aperture 246.

Referring now to FIG. 18, outer wall 176 may optionally include one or more a blade pockets 294 for partition blades 130. During the second partition position 84 and/or the maximum opening aperture 246, partition blades 130 are retracted into blade pockets 294, thereby minimizing blockage of air flow 54 into impeller 44 by the partition blades 130.

Partition blades 130 have an inner channel surface 296. In the embodiment of the present invention shown in FIGS. 11 and 12, the extended range compressor 42 includes an inner duct 114 and the inner channel surface 296 is revolved about impeller axis of rotation 46 with the partition blades 130 being in the second partition position 84 and/or the maximum opening aperture 246. In more detail, channel surface 296 aligns with an imaginary surface revolved about impeller axis of rotation 46 during the second partition position 84 and/or the maximum opening aperture 246 for embodiments of the present invention having an inner duct 114, thereby maximizing flow into impeller 44 during the large mass flow setting 76.

In the embodiment of the present invention shown in FIGS. 13 and 14, the extended range compressor 42 does not includes an inner duct 114, and the inner channel surface 296 is revolved about impeller axis of rotation 46 with the partition blades 130 being in the first partition position 82 and/or the minimum opening aperture 244. In more detail, channel surface 296 aligns with an imaginary surface revolved about impeller axis of rotation 46 during the first partition position 82 and/or the minimum opening aperture 244 for embodiments of the present invention not having an inner duct 114, thereby providing improved aerodynamic flow during the small mass flow setting 70.

Referring again to FIGS. 10, 11 and 12, the extended rang compressor 42 includes an inner duct 114, and inner duct 114 has an outlet clearance gap 138. As described previously, a small outlet clearance gap 138 is used to maintain a larger first outer channel pressure 80 than first inner channel pressure 78 during the small mass flow setting 70. With use of inner duct 114 a small clearance gap between partition blades 130 and impeller 44 is not required for maintaining a larger first outer channel pressure 80 than first inner channel pressure 78 during the small mass flow setting 70. Referring now to FIG. 12, partition blades 130 have downstream blade tips 298 and outer wall 176 has an increasing diameter upstream of the impeller inlet 56. Downstream blade tips 298 contact outer wall 176 upstream of impeller inlet 56 where the upstream diameter is larger, thereby providing a larger maximum opening aperture 246.

In the embodiment shown in FIG. 12 downstream blade tips 298 are outside of the impeller inlet diameter 164, thereby providing a large and streamlined air inlet.

Referring now to FIGS. 9, 11, 12 and 13, inner duct 114 has a minimum inlet cross sectional area 300, and inner channel 64 has an inner channel outlet area 112 during the first partition position 82 and/or the minimum opening aperture 244. According to an embodiment of the present invention, inner duct inlet cross sectional area 300 is smaller than inner channel outlet area 112 during the first partition position and/or the minimum opening aperture 244, thereby further inhibiting surge and increasing the small flow to large flow operational range of the compressor.

In more detail, according to the present invention, inner channel outlet area 112 is at least eight percent (8 percent) larger than the inner duct inlet cross sectional area 300 during the first partition position 82 and/or the minimum opening aperture 244.

Referring now to FIG. 6, electric motor 72 is turned on and off by an engine management controller 302. The engine management controller 302 receives power, torque or load demand requests from a driver, pilot or autonomous controller 304. The engine management controller 302 also receives sensor data 306 from engine and environmental sensors. The engine management controller 302 turns on and off the electric motor 72 based the power demand requests 304 and sensor data 306.

For example, the engine management controller 302 may include a lookup table having engine speed and engine load axes or coordinates. The load request is provided by the driver 304, and the engine speed coordinate is provided by a sensor 306. Each coordinate location may then have an on, off or pulse width modulated activation signal for the electric motor 72. The engine management controller may have more than one lookup table to account for variabilities such as engine manifold pressure, engine manifold temperature or atmospheric temperature, to name just a few of many possible other variables. The engine management controller may also have a time dependent algorithm that provides temporary increased power output from the electric motor 72 in order to minimize turbo lag. The engine management controller may include other time dependent algorithms to provide improved emissions control and/or smoother transitions from one power level to the next. The engine management controller may also provide algorithms to prevent surge, and in more detail to maintain pressure in outer channel 66 as needed for preventing surge.

The present invention provides a turbocharging system capable of providing high boost pressure ratios at all engine speeds and being powered with conventional 12 volt batteries for almost all automotive applications. According to the present invention, during small mass flow setting 70 only a portion of the intake air 54 is pressurized with the electrically powered secondary compressor 68, and the boost pressure of the electrical powered secondary compressor is only a fraction of the compressors overall pressure ratio. Consequently, only a small amount of electrical power is required to drive the secondary compressor 68, thereby enabling conventional 12 volt batteries to be used to power the electrically powered secondary compressor 68 for almost all automotive applications. The compressor also has a high efficiency because it is no longer being operated under near-stall flow conditions. Most importantly, the turbocharging system of the present invention has a low cost, in contrast to other technologies currently being pursued.

The extended range compressor 42 of the present invention may be used to improve vehicle fuel economy through engine downsizing, and reduce diesel engine emissions through improved intake air boost control. The present invention may also be used to increase vehicle performance.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions and/or properties disclosed herein.

The following claims particularly point out certain combinations and subcombinations regarded as novel and non-obvious. The claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through prescription of new claims in this or a related application.

Such claims, whether broader, narrower, equal, or different in scope to the original claims, also are regarded as included within the subject matter of the present disclosure.

The invention claimed is:

1. An extended range compressor having an impeller having a plurality of impeller blades, an impeller axis of rotation, and a casing, the impeller being rotatably mounted in the casing about the impeller axis of rotation for compression of a fluid,
   a small mass flow setting having an inner channel and an outer channel for flow of said fluid into the impeller,
   the inner channel further having a first inner channel pressure during the small mass flow setting, and the outer channel further having a first outer channel pressure during the small mass flow setting, and
   a secondary compressor for increasing the first outer channel pressure relative to the first inner channel pressure during the small mass flow setting for inhibiting backflow of air out of the impeller, and thereby enabling the extended range compressor to produce high boost pressures under small mass flow settings without incurring surge, and
   an adjustable partition having a first partition position during the small mass flow setting, said adjustable partition separating said inner channel and said outer channel during said first partition position during the small mass flow setting, thereby maintaining the higher pressure in outer channel than in the inner channel,
   and a large mass flow setting, said adjustable partition further having a second partition position during the large mass flow setting for providing a large mass flow into the impeller and thereby maximizing the small flow to large flow operational range of the extended range compressor.

2. The extended range compressor of claim 1, wherein the first outer channel pressure is more than twenty percent higher than the first inner channel pressure, thereby preventing compressor surge during the small mass flow setting,
   and the first inner channel pressure and first outer channel pressure being absolute static pressures.

3. The extended range compressor of claim 1, further having an overall pressure ratio and a gauge stagnation compressor outlet pressure, and
   the secondary compressor further having a secondary compressor pressure ratio, a gauge stagnation secondary compressor outlet pressure,
   wherein the gauge stagnation secondary compressor outlet pressure is more than 0.20 times the gauge stagnation compressor outlet pressure, thereby preventing compressor surge during the small mass flow setting.

4. The extended range compressor of claim 1 wherein said outer channel further has an annular partitioned volume,
   wherein said annular partitioned volume has a high speed rotating flow during said small mass flow setting, said high speed rotating flow and said impeller further having the same rotational direction,
   said outer channel thereby having a higher pressure than said inner channel and having high speed rotating flow during said small mass flow setting for inhibiting surge and providing a large range high efficiency compressor.

5. The extended range compressor of claim 4, further including a pressurized inlet volute,
   said pressurized inlet volute being pressurized by said secondary compressor during said small mass flow setting, wherein said outer channel further has an annular partitioned volume,
   wherein said pressurized inlet volute provides said higher pressure and said high speed rotating flow in said annular partitioned volume during said small mass flow setting for inhibiting surge and providing a large range high efficiency compressor.

6. The extended range compressor of claim 5 further having a flow regulating slot, said flow regulating slot being located between said inlet volute and said annular partitioned volume for regulating flow from the inlet volute into said annular partitioned volume, thereby providing a uniform annular inlet flow and thereby providing a uniform flow through said outer channel area.

7. The extended range compressor of claim 6 wherein said flow regulating slot has a slot curtain area, and said outer channel has an outer channel outlet area,
   Wherein said outer channel outlet area is more than thirty percent larger than said slot curtain area, thereby providing a large pressurized outer channel outlet area for suppressing surge.

8. The extended range compressor of claim 6, further having an impeller inlet diameter, and
   said flow regulating slot further having a slot width,
   wherein said slot width is less than twelve percent that of the impeller inlet diameter, thereby providing high speed rotating flow in the outer channel.

9. The extended range compressor of claim 1, further having an inlet volute for flow of fluid from the secondary compressor into the outer channel, said inlet volute further having a minimum volute inlet cross sectional area, and
   said outer channel further having an outer channel outlet area, and a control area, said control area being the outer channel outlet area defined during the small mass flow setting,
   said inner channel further has an inner channel outlet area, said inner channel outlet area being defined during the small mass flow setting,
   wherein said small mass flow setting has a first effective inlet area, said first effective inlet area being the sum of the inner channel outlet area and the minimum volute cross sectional area,
   wherein said large flow setting has a second effective inlet area, said second effective inlet area being the sum of the inner channel outlet area and the control area,
   wherein said second effective area is more than twenty percent larger than said first effective area, thereby providing a large flow capacity compressor.

10. The extended range compressor of claim 1, further having a first inlet duct and a second inlet duct, said outer channel further having an outer channel outlet area, and a control area, said control area being the outer channel outlet area defined during the small mass flow setting, wherein the second inlet duct is in fluid communication with the control area during the small mass flow setting, and the first inlet duct is in fluid communication with the control area during the large mass flow setting, wherein said adjustable partition separates the first inlet duct from the control area during said small mass flow setting, thereby maintaining the higher pressure in outer channel than in the inner channel during the small mass flow setting.

11. The extended range compressor of claim 1, further including a first inlet duct, and said outer channel further having a second outer channel inlet, said adjustable partition further including an inner duct and one or more movable sealing elements for forming a seal between said inner duct and said first inlet duct during said small flow setting for closing the second outer channel inlet during the small mass flow setting for maintaining a higher pressure in the outer channel than in the inner channel.

12. The extended range compressor of claim 1, further including one or more movable sealing elements, and actuation means for moving said one or more movable sealing elements from said large mass flow setting to said small mass flow setting, wherein said actuation means is said secondary compressor.

13. The extended range compressor of claim 1, further having an impeller inlet and an outlet clearance gap, said outlet clearance gap being between said adjustable partition and said impeller inlet during the small mass flow setting, wherein the outlet clearance gap is less than three millimeters, thereby maintaining a larger pressure in said outer channel than said inner channel during the small flow setting.

14. The extended range compressor of claim 1, wherein said outer channel further having an outer channel outlet area, and a control area, said control area being the outer channel outlet area defined during the small mass flow setting, wherein said control area is configured to prevent compressor surge during the small mass flow setting.

15. The extended range compressor of claim 1, wherein said extended range compressor has an overall mass flow and said secondary compressor has a second inlet mass flow, wherein said second inlet mass flow is at least twenty percent as large as said overall mass flow, thereby preventing compressor surge during the small mass flow setting.

16. The extended range compressor of claim 1, further having an inlet volute for flow of fluid from the secondary compressor into the outer channel, said inlet volute further having a minimum volute inlet cross sectional area, and said outer channel further having an outer channel outlet area, and a control area, said control area being the outer channel outlet area defined during the small mass flow setting, wherein said control area is more than twice as large as said minimum volute inlet cross sectional area during the small mass flow setting, thereby providing a large control area for suppressing surge.

17. The extended range compressor of claim 1, further having a first inner channel inlet and a second outer channel inlet, said second channel inlet being closed during the small mass flow setting, and said second channel inlet being open during the large mass flow setting.

* * * * *